US012761185B2

(12) United States Patent
Park et al.

(10) Patent No.: US 12,761,185 B2
(45) Date of Patent: Oct. 13, 2026

(54) DIFFERENTIAL TRAPPED ION MOBILITY SEPARATOR

(71) Applicant: Bruker Daltonics GmbH & Co. KG, Bremen (DE)

(72) Inventors: Melvin Park, Billerica, MA (US); Karsten Michelmann, Bremen (DE)

( * ) Notice: Subject to any disclaimer, the term of this patent is extended or adjusted under 35 U.S.C. 154(b) by 299 days.

(21) Appl. No.: 18/756,920

(22) Filed: Jun. 27, 2024

(65) Prior Publication Data

US 2025/0003923 A1 Jan. 2, 2025

Related U.S. Application Data

(60) Provisional application No. 63/510,706, filed on Jun. 28, 2023.

(51) Int. Cl.

| | |
|---|---|
| ***G01N 27/62*** | (2021.01) |
| ***G01N 27/623*** | (2021.01) |
| ***G01N 27/624*** | (2021.01) |
| ***G01N 30/72*** | (2006.01) |

(52) U.S. Cl.

CPC ......... *G01N 27/624* (2013.01); *G01N 27/623* (2021.01); *G01N 30/7206* (2013.01)

(58) Field of Classification Search

CPC . G01N 27/624; G01N 27/623; G01N 30/7206

See application file for complete search history.

(56) References Cited

U.S. PATENT DOCUMENTS

| | | | | |
|---|---|---|---|---|
| 6,630,662 | B1 | 10/2003 | Loboda | |
| 7,838,826 | B1 | 11/2010 | Park | |
| 9,683,964 | B2 | 6/2017 | Park | |
| 11,315,779 | B1 * | 4/2022 | Park | G01N 27/623 |
| 12,163,919 | B2 * | 12/2024 | Park | G01N 27/622 |
| 2004/0011956 | A1 | 1/2004 | Londry et al. | |
| 2010/0090102 | A1 * | 4/2010 | Rather | H01J 49/062 250/288 |
| 2010/0230588 | A1 | 9/2010 | Atkinson et al. | |
| 2012/0326020 | A1 | 12/2012 | Ivashin et al. | |
| 2013/0306858 | A1 | 11/2013 | Giles et al. | |

(Continued)

OTHER PUBLICATIONS

K. Michelmann et al., Fundamentals of Trapped Ion Mobility Spectrometry, J. Am. Soc. Mass Spectrom., 2015, vol. 26, 14-24.

(Continued)

*Primary Examiner* — Nicole M Ippolito

(74) *Attorney, Agent, or Firm* — DECODE Legal Inc.

(57) ABSTRACT

The invention relates to a trapped ion mobility separator, a hybrid mass spectrometric system and a method for analyzing ions. The trapped ion mobility separator comprises an ion channel in which ions move along an axis between a first end, at which ions are introduced into said ion channel, and a second end. Two axial forces acting on the ions are provided, the first axial force being caused by an alternating axial electric field and having an effect on the movement of the ions that is dependent on differential mobility, and the second axial force counteracting the first axial force at least temporarily. At least one of the two forces varies spatially and temporally, so that ions are trapped along the axis at mobility dependent positions and are driven progressively to one end of the ion channel as a function of their differential mobility.

30 Claims, 16 Drawing Sheets

(56) References Cited

U.S. PATENT DOCUMENTS

| | | | |
|---|---|---|---|
| 2019/0204273 | A1 | 7/2019 | Ujimoto et al. |
| 2020/0035477 | A1 | 1/2020 | Welkie et al. |
| 2022/0299473 | A1 | 9/2022 | Park |

OTHER PUBLICATIONS

R. Guevremont et al., Atmospheric Pressure lon Trapping in a Tandem FAIMS—FAIMS Coupled to a TOFMS: Studies with Electrospray Generated Gramicidin S Ions J Am Soc Mass Spectrom , vol. 12, 1320-1330 (2001).

A. Shvartsburg et al., Differential Ion Mobility Separations in the Low-Pressure Regime, Anal. Chem. 2018, vol. 90, Issue 1, 936-943 (2018).

F. Meier et al., Parallel Accumulation-Serial Fragmentation (PASEF): Multiplying Sequencing Speed and Sensitivity by Synchronized Scans in a Trapped Ion Mobility Device, J. Proteome Res. 2015, vol. 14, 5378-5387 (2015).

Mark Ridgeway et al., poster on "Maximizing Gas Phase Peak Capacity While Minimizing Analysis Time Through," 2013 ASMS Conference on Mass Spectrometry and Allied Topics, Jun. 2013.

Search Report of corresponding GB application No. GB2408951.8; Dr. Lyndon Ellis; Oct. 20, 2024.

* cited by examiner

DIFFERENTIAL TRAPPED ION MOBILITY SEPARATOR

BACKGROUND OF THE INVENTION

Field of the Invention

The invention relates to a trapped ion mobility separator, a hybrid mass spectrometric system and a method for analyzing ions.

Description of the Related Art

Ion mobility spectrometry (IMS) is an analytical technique that is used to investigate the mobility of ions in a gas and to separate them according to their mobility.

An inherent feature of ion mobility spectrometry is that the mobility of ions in a gas depends on molecular geometries of the ions such that it is often possible to resolve and thus separate isomers or conformers that cannot be resolved by mass spectrometry. Many applications also take advantage of the ability to determine the cross section of an analyte ion from its measured mobility. Knowledge of mobilities or cross sections has proven to be significant in many areas including identifying analytes (e.g., in proteomics and metabolomics), separating compound classes and determining molecular structures (e.g., in structural biology).

In trapped ion mobility spectrometry, ions are typically trapped by a spatially non-uniform DC electric field, typically an electric field gradient, and a counteracting gas flow, or along a spatially uniform electric DC field by a counteracting gas flow which has a spatially non-uniform axial velocity profile along the axis. The trapped ions are separated in space according to ion mobility and are subsequently eluted over time according to their mobility by adjusting either the gas velocity or the strength of the axial electric DC field (see, e.g., U.S. Pat. No. 6,630,662 B1 by Loboda and U.S. Pat. No. 7,838,826 B1 by Park). The theoretical basis of trapped ion mobility spectrometry is also described, for example, in the article "Fundamentals of Trapped Ion Mobility Spectrometry" by Michelmann et al. (J. Am. Soc. Mass Spectrom., 2015, 26, 14-24).

A trapped ion mobility separator is known, for example, from U.S. Patent Application Publication No. US 2022/0299473 A1. The trapped ion mobility separator disclosed there, comprises an ion channel through which ions move along an axis from an entrance to an exit and which has an elongate cross-sectional profile perpendicular to the axis. Another trapped ion mobility separator is known, for example, from U.S. Pat. No. 9,683,964 (Park et al.).

Typically, a trapped ion mobility separator is operated at a pressure of some hundred pascal (Pa), and the electric fields used in trapped ion mobility spectrometry ranges from a few volts per cm to several hundred volts per cm (e.g., 200 V/cm). In such a low field limit the ion drift velocity is proportional to the electric field strength and the mobility K is independent of the applied field. However above an electric field strength to gas particle density ratio (E/N) of about 20 Td (which relates to an electric field strength of approximately 5000 V/cm at atmospheric pressure), the ion drift velocity is no longer directly proportional to the applied electric field, and the mobility K becomes dependent on the applied field, having a considerable non-linear dependence on the electric field (E. A. Mason and E. W. McDaniel ("Transport Properties of Ions in Gases" (Wiley, New York, 1988)). At high electric field strength to particle density ratio, the mobility K is better represented by the low electric field constant mobility K(0) and field dependent terms $\alpha_i$:

$$K(E) = K(0)\left[1 + \alpha_2 (E/N)^2 + \alpha_4 (E/N)^4 + \ldots\right] \tag{1}$$

with $E$ = electric field strength $([E] = V/m)$ and $N$ = particle density $([N] = m^{-3})$ The effect of the dependence of mobility on the applied electric field is used in field asymmetric waveform ion mobility spectrometry (FAIMS), also known as differential mobility spectrometry (DMS). FAIMS, typically performed at atmospheric pressure, separates gas-phase ions based on the difference in mobility of ion species at high electric field strength, $K_H$, relative to mobility at low electric field strength, $K_L$—i.e. the ions' "differential mobility". An ion's differential mobility, dK, as measured via FAIMS is given by equation (2) below. The principles of operation of FAIMS have been described for example in the article "Atmospheric Pressure Ion Trapping in a Tandem FAIMS-FAIMS Coupled to a TOFMS: Studies with Electrospray Generated Gramicidin S Ions" by Guevremont et al. (J. Am. Soc. Mass Spectrom., 2001, 12, 1320-1330). However, using the FAIMS technique, the ions are transmitted through an analyzer region just selectively, whereby all not transmitted ion species are filtered out and are discarded by discharging. This is a significant disadvantage, especially when analyzing complex, multicomponent samples. When transmitting a selected component through the FAIMS, all other components are lost.

$$dK(E) = K(0)\left[\alpha_2 (E/N)^2 + \alpha_4 (E/N)^4 + \ldots\right] \tag{2}$$

where $dK(E)$ is the ion's differential mobility.

The article "Differential Ion Mobility Separations in the Low-Pressure Regime" by Shvartsburg et al. (Analytical Chemistry, 2018, 90, 936-943) discloses a FAIMS filter operated in a rough vacuum at a pressure down to 4.7 Torr (6 mbar). U.S. Patent Application Publication No. 2013/0306858A1 discloses a linear ion trap wherein an asymmetric voltage waveform is applied to electrodes forming the ion trap which causes ions to become radially separated according to their differential ion mobility. An axial potential barrier is arranged at the exit of the ion trap such that ions having a first differential ion mobility and a first radial displacement are retained axially within the ion trap but ions having a second differential ion mobility and a second radial displacement are ejected axially from the ion trap.

In view of the foregoing, the present invention is based on the task of advancing and enriching the state of the art and overcoming the disadvantage mentioned above by offering a new trap and separation dimension for ions in trapped ion mobility spectrometry. In particular, the task of the invention can be seen as to provide a trapped ion mobility separator that allows to trap and separate the entirety of introduced ion species according to their different behavior of mobility at low and high electric field strength. Finally, there is still a need to expand and improve the analysis capabilities of hybrid mass spectrometric systems. In the context of the disclosure, a trapped ion mobility separator is hereinafter referred to as a "TIMS".

The invention solves the task on which it is based with a trapped ion mobility separator according to claim 1, a mass spectrometric system according to claim 14, and a method for analyzing ions according to claim 21. Advantageous embodiments of the invention are subject of the dependent claims and are explained in more detail in the following description.

SUMMARY OF THE INVENTION

In a first aspect the invention provides a trapped ion mobility separator. The trapped ion mobility separator comprises

- an ion channel in which ions move along an axis between a first end of said ion channel, at which ions are introduced into said ion channel, and a second end of said ion channel, said ion channel containing a gas through which the ions pass, wherein the ion channel is supplied with radially confining voltages for preventing the ions from escaping the ion channel laterally,
- at least a first electrode and a second electrode arranged spaced apart from each other along said axis of said ion channel for defining an ion separation region therebetween,
- a first generator that causes a first axial force to be exerted on the ions along said axis by applying separating voltages to said first electrode and said second electrode to generate an alternating axial electric field, the first axial force having an effect on the movement of the ions that is dependent on differential mobility by virtue of its interplay with said gas, wherein said separating voltage is an alternating voltage and is applied so that for a first time interval an electric field with a first field strength is generated, and for a second time interval, following said first time interval, an opposing electric field with a second field strength is generated, which is lower in magnitude than the first field strength, said first time interval lasting a shorter time span than said second time interval,
- a second generator that causes a second axial force to be exerted on the ions along said axis, which is counteracting said first axial force at least temporarily, wherein said first generator and said second generator are configured such that at least one of the axial forces is changing in strength along the axis for trapping ions along said axis at mobility dependent positions where a force equilibrium of said first axial force and said second axial force exists for the ions,
- further comprising an electrical controller which communicates with said first generator and said second generator and varies at least one of said first axial force and said second axial force over time, such that the trapped ions are driven progressively to one of said first end and said second end of said ion channel as a function of their differential mobility.

The invention is based on the realization that the differential mobility behavior of ions can be used to trap and separate ions in a trapped ion mobility separator. In the context of the invention, the term "differential mobility" is defined as the difference in mobility of ion species at high electric field strength, relative to mobility at low electric field strength (see equation (2) above).

In this context, a "low electric field strength" is defined as a field strength in an order of magnitude where the mobility K of the ions is substantially defined by the low electric field constant mobility K(0):

$$K(E) \approx K(0) \tag{3}$$

Or, in other words, and with reference to equation (1) above, the "low electric field strength" represents an electric field strength so low, that the terms $\alpha_i(E/N)^i$, which will remain mathematically present, become so small that their contribution in the determination of the mobility K is below a resolution limit and thus negligible. Therefore, the term "low electric field strength" can be used under the assumption, that the mobility K is represented by the low electric field constant mobility K(0), whereas at high electric field strength, the mobility K is better represented by the low electric field constant mobility K(0) and field dependent terms $\alpha_i$(see equation (1) above).

In the context of the present disclosure, introducing, separating, and trapping ions in said separation region along said axis by a force equilibrium of said first axial force and said second axial force can be understood as an accumulation phase. Further, in the context of the disclosure, driving the trapped ions progressively to one of said first end and said second end of said ion channel as a function of their differential mobility, by varying at least one of the first axial force and the second axial force over time, can be understood as a subsequent elution phase.

In the context of the present disclosure, introducing the ions into the ion channel at the first end of the ion channel has to be understood as introducing or inserting or inputting the ions along said axis of the ion channel along which the ions move between the first end and the second end of the ion channel. In particular, that means, the ions are introduced along the axis, along which they are separated. Thus, in the context of the present disclosure, the introduction of the ions into the ion channel, the separation of the ions within the separation region in the ion channel, and the elution of the ions at one of the first and second end of the ion channel takes place collinearly.

In the context of the disclosure, the aforementioned alternating voltages are referred to as alternating separating voltages. The first axial force, caused by applying the aforementioned alternating separating voltages to the first electrode and the second electrode as described above, can be described as a synthesized asymmetric waveform V(t), as it is called in the state of the art. As known from the state of the art, the alternating electric field represented by the asymmetric waveform V (t) may lead to a different mobility behavior of the ions. Different drift velocities of the ions may result as described in the following:

During the first time interval, representing the high-voltage portion of the asymmetric waveform, the ions move in the separation region between the first electrode and second electrode within the ion channel with a longitudinal velocity $v_H$ approximated by $v_H=K_H E_H$, where $E_H$ is the applied high electric field, and $K_H$ is the high-field mobility under the operating conditions (i.e., electric field, pressure, temperature, and the like). The distance traveled by the ions during the first time interval of the asymmetric waveform can be approximated by $d_H=v_H t_H$, where $t_H$ is the duration of the high-field portion. During the longer lasting second time interval, representing the opposite polarity, low-voltage portion of the asymmetric waveform, the lateral velocity is $v_L=K_L E_L$, where $E_L$ is the applied low electric field, and $K_L$ is the low-field mobility under the operating conditions. The distance traveled is $d_L=v_L t_L$ where $t_L$ is the duration of the low-field portion. As at the high electric field $E_H$ the mobility $K_H$ is not equal to the mobility $K_L$ at low electric field $E_L$, the ions experience a net displacement from their original position in the ion channel for a single cycle. If ion species respond differently to the high electric field, the ratio of $K_H$ to $K_L$ may be different for each ion species. Thus, the ions are separated according to their differential mobility.

According to the arrangement of the first electrode and the second electrode along the axis of the ion channel of the trapped ion mobility separator, according to the invention the ions experience a net displacement along the axis within the ion channel, due to the above described generated alternating axial electric field. This net displacement is referred to as differential mobility drift in the context of the disclosure.

Thus, a trapped ion mobility separator according to the invention is named as differential trapped ion mobility separator (dTIMS). Compared to prior art TIMS devices and methods, the dTIMS device and method according to the present invention provide an additional tool for ion studies in a trapped ion mobility separator, since the change in ion mobility (differential mobility) can be monitored, instead of the absolute ion mobility. This represents another dimension of separation for the ions in trapped ion mobility spectrometry. Compared to FAIMS, the dTIMS device and method allow to analyze the entirety of the introduced ion species according to their differential mobility, thus, representing a significant advantage in comparison to the FAIMS technique.

Taking advantage of the different behavior of ion species in high and low electric fields, the dTIMS allows to trap and separate the ion species substantially according to their charge state because the differential mobility is correlated to the charge state. This represents a distinct advantage with regard to its use in a hybrid mass spectrometric system, in particular, if the dTIMS is nested coupled with a common ion mobility separator, like a TIMS, constructed and operated to disperse ions according to ion mobility, preferably in the low field limit, (tandem dTIMS/TIMS). In this way, ion species with a defined charge state can be selected and/or discarded in view of optional subsequent analyses. For example, ion species with a charge state of Z=1 can be trapped and separately transferred to downstream located analyzing devices, such as, for example, a fragmenting cell, or even can be discarded, as fragment spectra of single charge ion species have no or little information. Finally, the addition of the dTIMS to a mass spectrometric system leads to the significant advantage, that the peak capacity can be increased due to the addition of another dimension of separation. It also leads to mass spectra acquired by the mass analyzer as final detector being less crowded with, or de-populated of mass signals, peaks or features which may facilitate their evaluation and interpretation.

It should be made clear that the generated alternating axial electric field, as it is used as first axial force according to the differential trapped ion mobility separator of this disclosure, distinguishes from a generated travelling wave field, as it can be used in a trapped ion mobility separator, in the following: With regard to the alternating axial electric field, at substantially any time, the direction of the first axial force does not change along the axis in the separation region of the disclosed trapped ion mobility separator. In contrast, with regard to the travelling wave field, a thereby caused axial force has a change of direction depending on the position of the "traveling wave" within a separation region.

Said first end of said ion channel can represent an entrance region for ions, to enter the ion channel. Said first end of said ion channel can be shaped tapered. In particular, said first end of said ion channel can comprise an ion funnel. In doing so, the ions can be focused when entering the ion channel. Said second end of said ion channel can represent an exit region for ions, to exit the ion channel. Said second end of said ion channel can be shaped tapered. In particular, said second end of said ion channel can comprise an ion funnel. In doing so, the ions can be focused when exiting the ion channel. Additionally, shaping said first end and said second end tapered, advantageously leads to the fact that the effect of electric fields inside the dTIMS device on optionally upstream or downstream located devices can be minimized. It is also conceivable, that the first end of said ion channel can represent an entrance region for ions and an exit region for the ions at the same time.

One or more varying voltages can be applied to said first electrode and said second electrode at the same time. In particular, alternating separating voltages are applied to said first electrode and said second electrode to generate an alternating axial electric field. Further, compensation voltages can be applied to said first electrode and said second electrode to generate an electric compensation field. Further, confining voltages can be applied to said first electrode and said second electrode to generate an electric confining field to laterally confine the ions in said gas-filled ion channel. Confining voltages can be radiofrequency (RF) voltages or a combination of RF voltages and direct current (DC) voltages.

The dTIMS can be operated by varying at least one of the counteracting axial forces substantially continuously to increase said first axial force relative to said second axial force or to increase said second axial force relative to said first axial force. Alternatively, the dTIMS can be operated by varying at least one of the counteracting forces step-wisely to increase said first axial force relative to said second axial force or to increase said second axial force relative to said first axial force. The stepwise variation can be done in multiple incremental steps or by few steps. For example, the stepwise variation can be done by 3 to 100 steps, preferably by 3 to 50 steps, most preferably by 3 to 10 steps. A stepwise variation done by 3 to 10 steps for example creates a corresponding number of fractions each comprising ion species with a specific range of differential mobilities.

Said first time interval can correspond to less than half of one period of said separating voltage to one-quarter of one period of said separating voltage. Said second time interval can correspond to more than half of one period of said separating voltage to three-quarters of one period of said separating voltage. Preferably said first time interval can correspond to one third of one period of said separating voltage and said second time interval can correspond to two thirds of one period of said separating voltage. Selecting these time intervals, a good resolution regarding separating the ions can be reached. In particular, said first time interval can last for about 3.33 us and said second time interval can last for about 6.66 μs.

Said separating voltage applied by said first generator can be applied so that the potential is 500 V to 1000 V in said first time interval and that the potential is-150 V to −450 V in said second time interval. Preferably, said separating voltage applied by said first generator can be applied so that the potential is 700 V in said first time interval and that the potential is-350 V in said second time interval. Thus, in the first time interval, an electric field can be generated whose field strength is high enough that the ion velocity is no longer directly proportional to the applied field and the mobility K is better represented by the low electric field constant mobility K(0) and field dependent terms $\alpha_i$(see equation (1) above). In particular, in said first time interval a voltage of 350 V can be applied to said first electrode and a voltage of −350 V can be applied to said second electrode, and in said second time interval a voltage of −175 V can be applied to said first electrode and a voltage of 175 V can be applied to said second electrode. In general, the voltage between the first and the second electrode is preferably generated by applying two potentials of opposite sign to these electrodes. By keeping the absolute potentials on any given electrode as small as possible while simultaneously creating the largest potential difference possible across the analyzer, the ion separation can be maximized while simultaneously minimizing the risk of an electrical discharge between the electrodes or electrical elements. Alternatively, it is conceivable, that in said first time interval a voltage of 700 V can be applied to said first electrode and said second electrode has a potential of 0 V, or, in other words, said second electrode is maintained at ground potential, and in said second time interval a voltage of −350 V can be applied to said first electrode and said second electrode has a potential of 0 V, or, in other words, said second electrode is maintained at ground potential.

Selecting the above-mentioned preferred parameters concerning the duration of the first time interval (short time interval $t_H$) and the second time interval (long time interval $t_L$), and concerning the voltage level or the height of the potentials respectively (high voltage $v_H$ and low voltage $V_L$) ensures, that the integrated voltage-time product ($\int t \cdot V(t)\,dt$), and thus the field-time product, during each complete cycle is substantially zero. In particular, the above-mentioned preferred parameters substantially ensure that $(V_H\, t_H)+(V_L\, t_L)=0$, assuming that the electric field strength in the time intervals is constant.

However, it should be noted at this point that a combination of voltage and pressure constitutes the non-linear behavior in the drift velocity/mobility of the ions. Thus, even voltages in terms of amount lower than the above-mentioned voltages may be sufficient to cause this non-linear behavior of mobility, if there is a correspondingly adjusted pressure setting.

In a preferred embodiment said separating voltage is a substantially rectangular voltage. A substantially rectangular voltage offers the advantage, that in case of the change of the electric field the full field strength is present immediately. In an alternative embodiment, said separating voltage can be a substantially bi-sinusoidal voltage. It is also conceivable that said separating voltage can be a triangular voltage.

In another preferred embodiment said applied separating voltage has a frequency of 50 kHz to 2 MHz. Preferably said applied separating voltage has a frequency of 80 KHz to 120 kHz. Most preferably said applied separating voltage has a frequency of 100 KHz.

In another preferred embodiment the alternating axial electric field generated by said first generator has a maximum strength of 20 Td to 500 Td. In the context of the disclosure, this alternating axial electric field is also referred to as "electrical dispersion field". Td (townsend) is the unit of the ratio of the electric field strength and the gas particle density. Above an electric field strength to particle density ratio (E/N) of about 20 Td (1 Td=$10^{-17}$ V cm$^2$) the ion mobility has a considerable non-linear dependence on the electric field. An electric field strength to particle density ratio (E/N) of about 20 Td relates to an electric field strength of approximately 5000 V/cm at atmospheric pressure. Preferably the alternating axial electric field generated by said first generator has a strength of 150 Td to 250 Td. Most preferably the alternating axial electric field generated by said first generator has a strength of 200 Td.

Said second axial force can be caused in different ways. In a preferred embodiment said second axial force is caused by said second generator applying compensation voltages to said first electrode and said second electrode to generate an electrical compensation field. The generated electrical compensation field can be directed downstream—i.e., toward an exit end. Alternatively, the generated electrical compensation field can be directed upstream—i.e., toward an entrance end. Finally, the generated electrical compensation field has to be directed such, that the second axial force, which is represented by the electrical compensation field, counteracts the first axial force. Dependent on the direction of the electrical compensation field a movement of the ions is directed towards said first end or said second end of said ion channel. Preferably said second axial force is caused by said second generator applying electric DC voltages to said first and said second electrode to generate an axial direct current field (DC field). This gives the advantage over prior art TIMS, that the dTIMS can be operated with a gas at rest. This offers the additional advantage that expensive gases, like Helium, can also be used. In prior art TIMS analyzers a force on the ions is typically generated using a moving gas. However, a laminar flow of gas through the analyzer develops a parabolic flow profile. Thus, the flow, and the consequent force on the ions, near the lateral boundary of the analyzer will be lower than near the axis of the device. An advantage of using an electric DC field instead of a gas flow as second axial force is, that the DC field can be designed such that it is constant along lateral directions resulting in a laterally homogenous force on the ions and therefore homogeneous drifts across the whole inner width of the ion channel. Further, the lateral cross section and length of a TIMS will necessarily determine its gas conductivity. Thus, the lateral dimensions and length of a TIMS analyzer which uses an axial gas flow as the second axial force will be limited by the pumping speed of commercially reasonable pumps. The advantage of a dTIMS operated with a gas at rest is that a lateral extension of the device does not affect or limit its resolution.

In an alternative embodiment said second axial force is caused by said second generator applying transient electric DC voltages to said first and said second electrode to generate an axial transient electric DC field (also called as "travelling wave field").

It will be understood, however, by a person skilled in the art, that in the context of the invention in case two electric fields are generated as first and second axial force, the aforementioned first generator and second generator can also be understood as a common electrical component with two different electrical units (representing the first and second generator), which generate the first and second axial force, respectively.

In yet another embodiment said second axial force is caused by said second generator generating an axial gas flow.

In another preferred embodiment said first electrode and said second electrode are shaped and aligned so that said first electrode and said second electrode are enclosing said separation region within said ion channel perpendicular to said axis. In this way, the electrical field generated by supplying the electrodes with voltages is affecting the whole volume of the ion channel. This also advantageously results in confining the ions in the gas-filled ion channel or preventing the ions from escaping the ion channel laterally. Said first electrode can be assigned to said first end of said ion channel. Said second electrode can be assigned to said second end of said ion channel. Thus, the electrical field generated by supplying the electrodes with voltages is directed parallel to the longitudinal direction of the ion channel, such that the ions move along a desired direction, namely along the longitudinal direction between the first end and the second end of the ion channel.

In another preferred embodiment said ion channel comprises a plurality of additional electrodes of the same shape and alignment as said first electrode and said second electrode. Said additional electrodes are located along said axis within said ion channel between said first electrode and said second electrode. In this way it can be ensured that a stable, homogeneous electric field is available. Said additional electrodes can be arranged each about 1 mm apart from each other. At the same time or in an alternative embodiment, said additional electrodes can be connected by means of a resistor chain. In particular, all resistors can have the same resistance. In this way, a uniform division of the voltage is ensured. At the same time or in an alternative embodiment, said additional electrodes can be supplied with voltages using separate voltage generators. In this way, individual of the additional electrodes can be supplied with different voltages. Said additional electrodes can be arranged stacked (stacked electrodes). The alternating separating voltages to generate the alternating axial electric field can be applied to said additional electrodes. Further, the compensation voltages to generate the electric compensation field can be applied to said additional electrodes. Further RF voltages or a combination of RF—and DC voltages can be applied to said additional electrodes. The latter allows to confine the ions in the gas-filled ion channel.

In another preferred embodiment said ion channel has an elongated cross-sectional profile perpendicular to the axis with a first direction of extension and a second direction of extension. Thereby the first direction of extension is preferably longer than the second direction of extension. In a longitudinal direction (z) along said axis, said ion channel can have a dimension of 10 mm to 30 mm. Preferably said ion channel can have a dimension of 15 mm in said longitudinal direction along said axis. In a first lateral direction (x), which extends perpendicular to said longitudinal direction and represents said first direction of extension, said ion channel can have a dimension of 10 mm to 300 mm. Preferably in said first lateral direction said ion channel can have a dimension of 60 mm. In a second lateral direction (y), which extends perpendicular to said longitudinal direction and represents said second direction of extension, said ion channel can have a dimension of 5 mm to 10 mm. Preferably in said second lateral direction said ion channel can have a dimension of 8 mm. This laterally extended shaping enables in an advantageous way that ions do not have to be trapped along a line, but in an extended volume that is substantially elongated in one lateral direction. In this way, the charge capacity is significantly increased, compared to a device without laterally extended shaping, without restricting the mobility resolution. Further, this allows a high field strength in the longitudinal direction by applying reasonable voltages to the electrodes. Said ion channel can be shaped straight along the extended lateral dimension or curved.

In an alternative preferred embodiment said ion channel has a circular cross-sectional profile perpendicular to the longitudinal axis. Said circular cross-sectional profile can have a diameter of 30 mm to 70 mm. Preferably, said circular cross-sectional profile can have a diameter of 50 mm. In that embodiment, the ion channel can have an exterior wall. The exterior wall can represent an outer radius of the ion channel. Further, the ion channel can have an interior wall. The interior wall can represent an inner radius of the ion channel. Between the outer radius and the inner radius, a gap can be provided. The gap can represent an annulus, i.e., the difference between the outer radius and the inner radius (ring-shaped space). The annulus can have a dimension of 8 mm, which represents the thickness of the annulus. Ions can be radially confined within the annulus. Confining the ions within the annulus, provides an increased charge capacity. This way of shaping can further increase the charge capacity. In this embodiment, in a longitudinal direction (z) along said axis, said ion channel can have a dimension of 10 mm to 30 mm. Preferably said ion channel can have a dimension of 15 mm in said longitudinal direction along said axis.

In another preferred embodiment the trapped ion mobility separator is being coupled to a vacuum system that is designed and configured to operate the dTIMS at a gas pressure in a range of 0.5 mbar to 20 mbar. Preferably the vacuum system is designed and configured to operate the dTIMS at a gas pressure in a range of 2 mbar to 10 mbar. For this purpose, the vacuum system may comprise pumps. This pressure range allows a lateral ion confinement by using electric RF fields.

In another preferred embodiment the trapped ion mobility separator further comprises an ion trap. Said ion trap is located upstream of said separation region within said ion channel. Said ion trap can be located adjacent to said separation region. Said ion trap is set up for storing ions. The additional ion trap allows in a beneficial manner, that the dTIMS can be operated in a parallel accumulation mode. That means, the ion trap can accumulate ions in an advantageous way, while simultaneously ions can be separated downstream in the separation region. In particular, the ion trap allows a parallel accumulation mode with a near one hundred percent duty cycle. Preferably, said ion trap can have substantially the same width as said separation region. Preferably, said ion trap can have substantially the same height as said separation region.

In another preferred embodiment said first generator and said second generator are configured such that the effective axial force resulting from the first axial force and second axial force is forming a barrier with a substantially constant plateau where the trapped ions leave said separation region and/or said ion channel.

In another preferred embodiment said separating voltage applied by said first generator is applied so that the potential applied to said first electrode has opposite polarity to the potential applied to said second electrode.

In another preferred embodiment said first generator and said second generator are configured such that the variation of the at least one of said first axial force and said second axial force over time is stepwise resulting in release of multiple fractions, each fraction comprising multiple ion species, or substantially continuous.

The trapped ion mobility separator according to the invention can be operated as an individual device (or stand-alone device) for measuring the differential mobility of the ions. Alternatively, it is conceivable that the dTIMS is coupled with other devices, such as a mass spectrometer (mass analyzer). When coupling a dTIMS and a mass spectrometer, both, the differential mobility, and the mass of the ions can be determined from the measured data.

In a second aspect the invention provides a mass spectrometric system. The mass spectrometric system comprises an ion source and a mass analyzer with an ion detector. Further, mass spectrometric system comprises at least a first trapped ion mobility separator, located downstream of said ion source. At the same time or in an alternative embodiment said first trapped ion mobility separator is located upstream of said mass analyzer. Said first trapped ion mobility separator comprises an ion channel in which ions move along an axis between a first end of said ion channel, at which ions are introduced into said ion channel, and a second end of said ion channel, said ion channel containing a gas through which the ions pass, wherein the ion channel is supplied with radially confining voltages for preventing the ions from escaping the ion channel laterally, at least a first electrode and a second electrode arranged spaced apart from each other along said axis of said ion channel for defining an ion separation region therebetween, a first generator that causes a first axial force to be exerted on the ions along said axis by applying separating voltages to said first electrode and said second electrode to generate an alternating axial electric field, the first axial force having an effect on the movement of the ions that is dependent on differential mobility by virtue of its interplay with said gas, wherein said separating voltage is an alternating voltage and is applied so that for a first time interval an electric field with a first field strength is generated, and for a second time interval, following said first time interval, an opposing electric field with a second field strength is generated, which is lower in magnitude than the first field strength, said first time interval lasting a shorter time span than said second time interval, a second generator that causes a second axial force to be exerted on the ions along said axis, which is counteracting said first axial force at least temporarily, wherein said first generator and said second generator are configured such that at least one of the axial forces is changing in strength along the axis for trapping ions along said axis at mobility dependent positions where a force equilibrium of said first axial force and said second axial force exists for the ions, further comprising an electrical controller which communicates with said first generator and said second generator and varies at least one of said first axial force and said second axial force over time, such that the trapped ions are driven progressively to one of said first end and said second end of said ion channel as a function of their differential mobility.

Thus, the above-described trapped ion mobility separator can be part of a hybrid mass spectrometric system, comprising additionally at least an ion source upstream of said trapped ion mobility separator and a mass analyzer with an ion detector downstream of said trapped ion mobility separator. The above-described trapped ion mobility separator according to the invention is named as differential trapped ion mobility separator (dTIMS).

The ion source of the mass spectrometric system is set up to generate ions. For example, said ion source of the mass spectrometric system can generate ions using spray ionization (e.g., electrospray (ESI) or thermal spray). Alternatively, said ion source of the mass spectrometric system can generate ions using desorption ionization (e.g., matrix-assisted laser/desorption ionization (MALDI) or secondary ionization (SIMS)). In another alternative, said ion source of the mass spectrometric system can generate ions using chemical ionization (CI). In another alternative, said ion source of the mass spectrometric system can generate ions using photo-ionization (PI). In another alternative, said ion source of the mass spectrometric system can generate ions using electron impact ionization (EI). In another alternative, said ion source of the mass spectrometric system can generate ions using gas-discharge ionization.

The mass analyzer of the mass spectrometric system is set up to analyze ions according to their mass or more precisely mass to charge ratio. For example, said mass analyzer can be a time-of-flight analyzer. Preferably said mass analyzer can be a time-of-flight analyzer with orthogonal injection of ions. Alternatively, said mass analyzer can be an electrostatic ion trap of the Kingdon type, such as the Orbitrap® from Thermo. In another alternative, said mass analyzer can be an RF ion trap. In another alternative, said mass analyzer can be an ion cyclotron resonance (ICR) ion trap or a quadrupole mass filter.

In a preferred embodiment the mass spectrometric system further comprises a fragmentation cell. The fragmentation cell is set up to dissociate ions into fragment ions. Preferably, said fragmentation cell is located between said first trapped ion mobility separator and said mass analyzer. For example, the ions can be dissociated in said fragmentation cell by collision induced dissociation (CID). Alternatively, the ions can be dissociated in said fragmentation cell by surface induced dissociation (SID). In another alternative, the ions can be dissociated in said fragmentation cell by photo-dissociation (PD). In another alternative, the ions can be dissociated in said fragmentation cell by electron-induced dissociation, such as electron capture dissociation (ECD), electron transfer dissociation (ETD), collisional activation after electron transfer dissociation (ETcD), or activation concurrent with electron transfer dissociation (AI-ETD). In another alternative, the ions can be dissociated in said fragmentation cell by reactions with highly excited or radical neutral particles. Also conceivable is an embodiment with a further dTIMS, located downstream of the fragmentation cell. This could be beneficial to select fragment ions with a defined charge state, as the dTIMS allows to trap and separate the ion species substantially according to their charge state because the differential mobility is correlated to the charge state.

In another preferred embodiment the mass spectrometric system further comprises a mass filter. Preferably, said mass filter is located between said first trapped ion mobility separator and said fragmentation cell.

In another preferred embodiment the mass spectrometric system further comprises a second ion mobility separator, preferably a trapped ion mobility separator. Preferably, said second ion mobility separator is located downstream of said first trapped ion mobility separator. Preferably, said second ion mobility separator is a trapped ion mobility separator constructed and operated to disperse ions according to ion mobility, preferably in the low field limit. Alternatively, said second ion mobility separator can be another ion mobility separator according to the invention. Preferably, said first trapped ion mobility separator and said second ion mobility separator are nested coupled, i.e. that the first trapped ion mobility separator operates on a substantially larger time scale than the second ion mobility separator such that the second ion mobility separator can analyze single ion species separated by the first trapped ion mobility separator or each fraction provided by the first trapped ion mobility separator. In doing so, the information content of both devices (differential mobility, given by the field dependent terms ai, and constant mobility K(0)) can be added together. A system comprising a first differential TIMS nested coupled with a TIMS constructed and operated to disperse ion according to ion mobility, preferably in the low field limit, can be termed as tandem dTIMS/TIMS.

In another preferred embodiment the mass spectrometric system further comprises a first housing assigned to the first trapped ion mobility separator. In particular, the first housing may enclose the first trapped ion mobility separator. Additionally, the mass spectrometric system comprises a second housing assigned to the second ion mobility separator. In particular, the second housing may enclose the second ion mobility separator. The first housing and the second housing may represent a vacuum chamber each. The first housing and the second housing may contain a gas (drift gas) each. The gas assigned to the first housing (and thus to the first ion mobility separator) can differ from the gas assigned to the second housing (and thus to the second ion mobility separator). In particular, the gas assigned to the first housing and the first ion mobility separator may be a gas different from the gas assigned to the second housing and the second ion mobility separator. For example, the gases used may be one of $H_2$, He, Ar, $N_2$, $CO_2$ or mixtures of these gases. The use of other gases or mixtures of or with any other gases than those mentioned above is conceivable. Optionally, modifiers may be introduced into the gas. Modifiers may include acetonitrile, methanol, small hydrocarbons, $SF_6$, or any other vapor. Using different gases within the first and second housing enables in an advantageous way, that ions which may not be sufficiently separated within the first ion mobility separator may be separated within the second ion mobility separator, as the type of gas has an effect on the drift velocity of the ions. It should be noted, that even if the ion mobility separator is operated with a gas at rest (this is the case when both, the first and the second axial force, are generated by electric fields) a low gas flow is present. However, this low gas flow only serves to separate the gas atmosphere within the housings.

In another preferred embodiment the mass spectrometric system further comprises an ion selector. The ion selector is set up to select ions. Preferably, said ion selector is located between said first trapped ion mobility separator and said second ion mobility separator.

In another preferred embodiment, the mass spectrometric system further comprises at least one ion trap. The ion trap is set up to store ions. Preferably, a first ion trap is located upstream of said first trapped ion mobility separator. In addition, or alternatively a second ion trap is located between said first trapped ion mobility separator and said second ion mobility separator.

Furthermore, the mass spectrometric system can comprise a separation device. Said separation device can be a gas chromatography device. Alternatively, said separation device can be a liquid chromatography device. It is also conceivable, that the mass spectrometric system further comprises an electrophoretic device. Alternatively, an electrophoretic device can be coupled to the hybrid mass spectrometric system.

The preferred embodiments described for the aforementioned trapped ion mobility separator are also preferred embodiments of the mass spectrometric system. The preferred embodiments for the mass spectrometric system, which refer to the trapped ion mobility separator are also preferred embodiments of the aforementioned trapped ion mobility separator.

In a third aspect the invention provides a method for analyzing ions, using a first trapped ion mobility separator. Preferably the method is performed in a mass spectrometric system. The method comprises the steps of:

- providing an ion channel in which ions move along an axis between a first end of said ion channel, at which ions are introduced into said ion channel, and a second end of said ion channel, said ion channel containing a gas through which the ions pass, wherein the ion channel is supplied with radially confining voltages for preventing the ions from escaping the ion channel laterally,
- providing at least a first electrode and a second electrode arranged spaced apart from each other along said axis of said ion channel for defining an ion separation region therebetween,
- generating a first axial force that is imparted to the ions along said axis by applying alternating separating voltages to said first electrode and said second electrode to generate an alternating axial electric field, the first axial force having an effect on the movement of the ions that is dependent on differential mobility by virtue of its interplay with said gas,
- applying said alternating separating voltage so that for a first time interval an electric field with a first field strength is generated, and for a second time interval, following said first time interval, an opposing electric field with a second field strength is generated, which is lower in magnitude than the first field strength, said first time interval lasting a shorter time span than said second time interval,
- generating a second axial force that is imparted to the ions along said axis and that counteracts said first axial force at least temporarily,
- changing at least one of the axial forces in strength along the axis for trapping ions along said axis at mobility dependent positions where a force equilibrium of said first axial force and said second axial force exists for the ions,
- varying at least one of said first axial force and said second axial force over time, such that the trapped ions are driven progressively to one of said first end and said second end of said ion channel as a function of their differential mobility.

The aforementioned trapped ion mobility separator according to the invention is named as differential trapped ion mobility separator (dTIMS).

The method for analyzing ions comprises the step of introducing the ions into the ion channel at the first end of the ion channel. Introducing the ions into the ion channel at the first end of the ion channel has to be understood as introducing the ions along said axis of the ion channel along which the ions move between the first end and the second end of the ion channel. In particular, that means, the ions are introduced along the axis, along which they are separated. Introducing ions into the ion channel may be understood as injecting or inserting or inputting ions into the ion channel.

Said first time interval can correspond to less than half of one period of said separating voltage to one-quarter of one period of said separating voltage and said second time interval can correspond to more than half of one period of said separating voltage to three-quarters of one period of said separating voltage. Preferably said first time interval can correspond to one third of one period of said separating voltage and said second time interval can correspond to two thirds of one period of said separating voltage. Selecting these time intervals, a good resolution regarding separating the ions can be reached. In particular, said first time interval can last for about 3.33 μs and said second time interval can last for about 6.66 μs.

In a preferred embodiment the method for analyzing ions further comprises the step of generating the alternating axial electric field with a maximum strength of 20 Td to 500 Td, preferably of 150 Td to 250 Td, most preferably of 200 Td.

Preferably the alternating axial electric field is generated with a strength of 150 Td to 250 Td. Most preferably the alternating axial electric field is generated with a strength of 200 Td. Preferably, a first generator can be used to generate the alternating axial electric field.

A first generator can apply said separating voltage so that the potential is 500 V to 1000 V in said first time interval and that the potential is −150 V to −450 V in said second time interval. Preferably, a first generator can apply said separating voltage so that the potential is 700 V in said first time interval and that the potential is-350 V in said second time interval. Thus, in the first time interval, an electric field can be generated whose field strength is high enough, that the ion velocity is no longer directly proportional to the applied field and the mobility K is better represented by the low electric field constant mobility K(0) and field dependent terms $\alpha_i$(see equation (1) above). In particular, in said first time interval a voltage of 350 V can be applied to said first electrode and a voltage of −350 V can be applied to said second electrode. In particular, in said second time interval a voltage of −175 V can be applied to said first electrode and a voltage of 175 V can be applied to said second electrode. In general, the voltage between the first and the second electrode is preferably generated by applying two potentials of opposite sign to these electrodes. By keeping the absolute potentials on any given electrode as small as possible while simultaneously creating the largest potential difference possible across the analyzer, the ion separation can be maximized while simultaneously minimizing the risk of an electrical discharge between the electrodes or electrical elements. Alternatively, it is conceivable, that in said first time interval a voltage of 700 V can be applied to said first electrode and said second electrode has a potential of 0 V or, in other words, said second electrode is maintained at ground potential, and in said second time interval a voltage of −350 V can be applied to said first electrode and said second electrode has a potential of 0 V or, in other words, said second electrode is maintained at ground potential.

However, it should be noted at this point that a combination of voltage and pressure constitutes the non-linear behavior in the drift velocity/mobility of the ions. Thus, even voltages in terms of amount lower than the above-mentioned voltages may be sufficient to cause this non-linear behavior, if there is a correspondingly adjusted pressure setting.

In another preferred embodiment the method for analyzing ions further comprises the step of analyzing separated ions as a function of mobility in a second ion mobility separator. Preferably said second ion mobility separator is a trapped ion mobility separator, constructed and operated to disperse ions according to mobility, preferably in the low field limit. Preferably said second trapped ion mobility separator is located downstream of said first trapped ion mobility separator.

In another preferred embodiment the method for analyzing ions further comprises the step of analyzing separated ions as a function of mass in a mass analyzer. Said mass analyzer is located downstream of said second ion mobility separator constructed and operated to disperse ions according to ion mobility, preferably in the low field limit.

In another preferred embodiment the method for analyzing ions further comprises the step of dissociating separated ions into fragment ions and analyzing said fragment ions in a mass analyzer. Preferably, the ions are dissociated in a fragmentation cell. Preferably, said fragmentation cell and said mass analyzer are located downstream of said first trapped ion mobility separator. In another embodiment in which a second ion mobility separator, constructed and operated to disperse ions according to ion mobility, preferably in the low field limit, is provided, which is located downstream of said first trapped ion mobility separator, said fragmentation cell and said mass analyzer are preferably located downstream of said second ion mobility separator.

In another preferred embodiment the method for analyzing ions further comprises the step of selecting and/or filtering the separated ions according to mass prior to fragmentation. Additionally, or in an alternative embodiment, the method for analyzing ions further comprises the step of selecting and/or filtering the separated ions according to their charge state prior to fragmentation.

In another preferred embodiment the method for analyzing ions further comprises the step of accumulating ions from an ion source in an ion trap located upstream of said first trapped ion mobility separator while ions are analyzed in said first trapped ion mobility separator.

In another preferred embodiment the method for analyzing ions further comprises the step of step-wisely varying at least one of said first axial force and said second axial force over time, such that the trapped ions are driven in multiple separated ion fractions to one of said first end and said second end of said ion channel as a function of their differential mobility.

In another preferred embodiment the method for analyzing ions further comprises the step of analyzing said separated ion fractions as a function of mobility in a second ion mobility separator. Preferably said second ion mobility separator is a trapped ion mobility separator constructed and operated to disperse ions according to ion mobility, preferably in the low field limit. Said second ion mobility separator is located downstream of said first trapped ion mobility separator wherein preferably said first trapped ion mobility separator and said second ion mobility separator are nested coupled, i.e. that the first trapped ion mobility separator operates on a substantially larger time scale than the second ion mobility separator such that the second ion mobility separator can analyze single ion species separated by the first trapped ion mobility separator or each fraction provided by the first trapped ion mobility separator.

In another preferred embodiment the method for analyzing ions further comprises the step of deselecting ion fractions which substantially comprise singly charged ion species.

Preferred embodiments described for the aforementioned trapped ion mobility separator according to the invention or preferred embodiments described for the aforementioned mass spectrometric system are also preferred embodiments of the method for analyzing ions.

The principle as previously disclosed may be combined, contextualized, or carried out with one or more of the following aspects, in particular to provide a method for analysis of complex samples:

(a) Providing an instrument including an ion source, a dTIMS according to the disclosure, an ion mobility separator (IMS), and a mass analyzer.

Preferably the IMS is a trapped ion mobility separator (TIMS). The mass analyzer may be one of the following: quadrupole (Q) mass analyzer or a time-of flight (TOF) mass analyzer. For example, the ion source can generate ions using spray ionization (e.g., electrospray (ESI) or thermal spray). Alternatively, the ion source can generate ions using desorption ionization (e.g., matrix-assisted laser/desorption ionization (MALDI) or secondary ionization (SIMS)). In another alternative, the ion source can generate ions using chemical ionization (CI), photo-ionization (PI), electron impact ionization (EI) or atmospheric pressure chemical ionization (APCI). In another alternative, the ion source can generate ions using gas-discharge ionization. Preferably, further separation means are provided upstream of the ion source. The separation mean provided upstream of the ion source may be one which is suitable to perform one of the following methods: liquid chromatography (LC), gas chromatography (GC), capillary electrophoreses (CE). Preferably the instrument comprises a vacuum system. The vacuum system may take up all components located downstream of the ion source.

(b) Performing liquid chromatography (LC) of the sample.

(c) Ionizing the sample material eluted from the LC (or another separation means located upstream of the ion source) using the ion source (e.g., the ESI) and introducing the ionized sample material (ions) into a vacuum system of the instrument.

(d) Accumulating the ions in an ion trap, which is located upstream of the dTIMS.

(e) Injecting the ions from the ion trap into the dTIMS, which is located downstream of the ion trap.

(f) Releasing ions from the dTIMS according to the ions' differential mobility. Preferably the ions are released from the dTIMS in form of fractions. The ions may be released from the dTIMS as a single fraction or as multiple fractions each of a selected range of differential mobility. Remaining ions, which are not released, may be eliminated.

(g) Using one of the following instruments, which are located downstream of a dTIMS, to perform parallel accumulation serial fragmentation (PASEF, cf. Florian Meier et al., J. Proteome Res. 2015, 14, 12, 5378-5387) on the ions released from the dTIMS: an ion mobility separator (IMS), a quadrupole (Q) mass analyzer, a fragmentation cell, a time-of-flight (TOF) mass analyzer, in particular a TOF analyzer using orthogonal acceleration.

Preferably, PASEF is one of DDA PASEF (DDA=data dependent analysis), DIA PASEF (DIA=data independent analysis), MIDIA PASEF (MIDIA=Maximizing Information content in DIA), Synchro PASEF, or any other variation of PASEF.

BRIEF DESCRIPTION OF THE DRAWINGS

The invention can be better understood by referring to the following figures. The elements in the figures are not necessarily to scale, emphasis instead being placed upon illustrating the principles of the invention (often schematically).

DETAILED DESCRIPTION

While the invention has been shown and described with reference to a number of different embodiments thereof, it will be recognized by those skilled in the art that various changes in form and detail may be made herein without departing from the scope of the invention as defined by the appended claims.

Figure 1A:
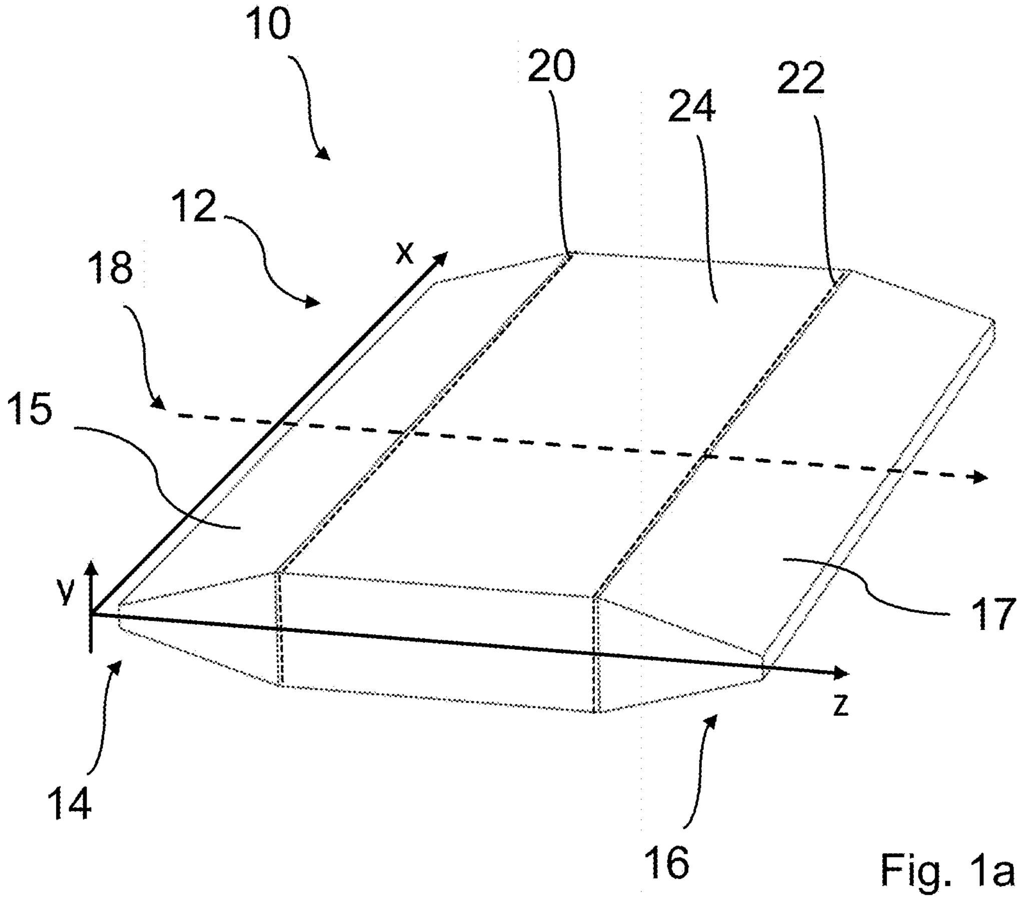
FIG. 1*a* shows a first schematic perspective view of a first embodiment of a trapped ion mobility separator according to the invention.
Figure 1B:
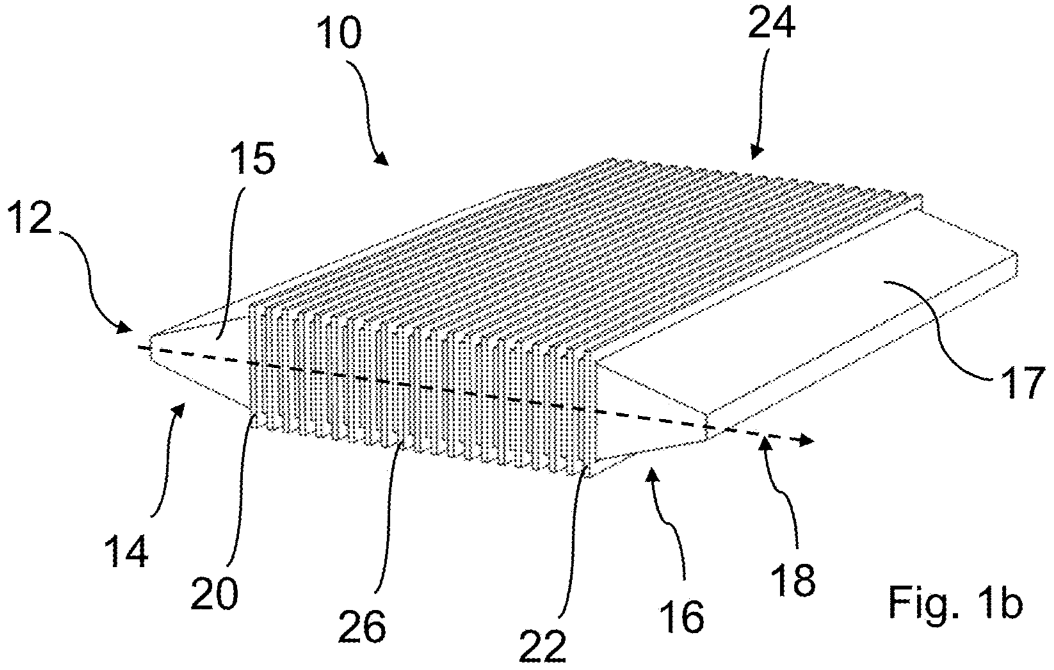
FIG. 1*b* shows a second schematic perspective view of the first embodiment of a trapped ion mobility separator according to the invention.
Figure 1C:
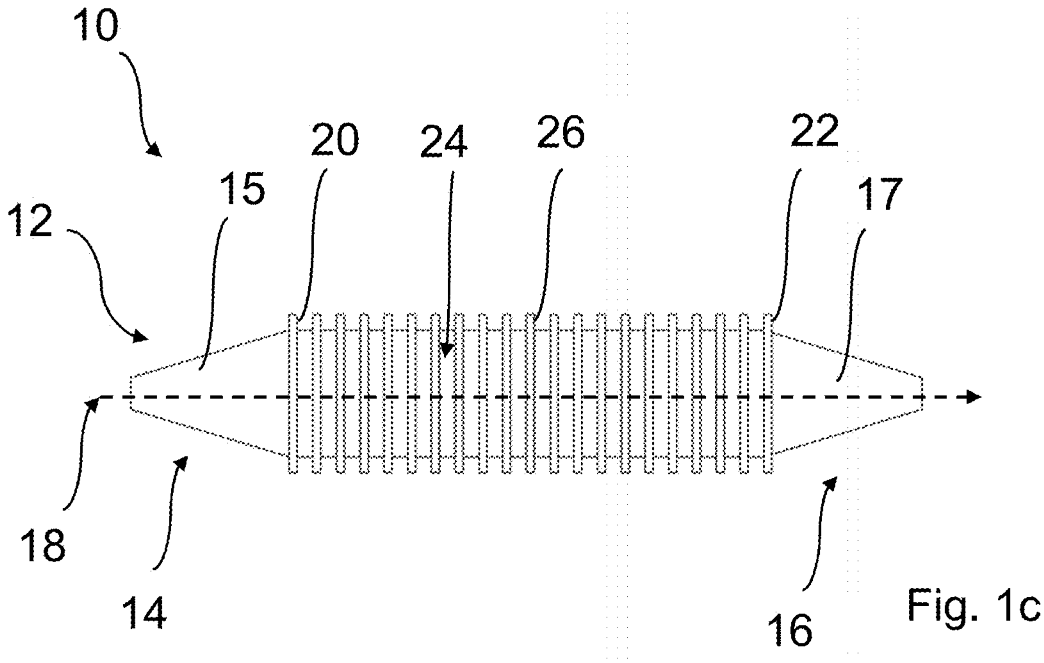
FIG. 1*c* shows a schematical longitudinal sectional view of the first embodiment of the trapped ion mobility separator according to the invention.

FIGS. 1*a*-1*b* show schematic perspective views of a first embodiment of a trapped ion mobility separator 10 according to the invention, and FIG. 1*c* shows a schematical longitudinal sectional view of the first embodiment of the trapped ion mobility separator 10. The trapped ion mobility separator 10 is used to trap and separate ions according to their differential mobility. Thus, the trapped ion mobility separator 10 is a differential trapped ion mobility separator (dTIMS). The trapped ion mobility separator 10 may be part of a mass spectroscopic system 100.

The trapped ion mobility separator 10 comprises an ion channel 12. The ion channel 12 has a first end 14. Further, the ion channel 12 has a second end 16, facing away from the first end 14. In the embodiment example, the first end 14 and the second end 16 are tapered shaped. Ions, which can be provided by an external ion source 112 (FIG. 15), can move through the ion channel 12 along an axis 18, which is represented by a dashed line in the figure, between the first end 14 and the second end 16 of the ion channel 12. In the embodiment example, the first end 14 represents an entrance region 15 for the ions. In particular, in the embodiment example, the entrance region 15 is an entrance funnel. The second end 16 represents an exit region 17 for the ions in the embodiment example. In particular, in the embodiment example, the exit region 17 is an exit funnel. The ion channel 12 contains a gas, through which the ions pass.

The trapped ion mobility separator 10 comprises a first electrode 20, which is represented by a dashed line in the FIG. 1*a*. Further, the ion channel 12 comprises a second electrode 22, which is represented by a dashed line in the FIG. 1*a*. The first electrode 20 and the second electrode 22 are arranged spaced apart from each other along the axis 18 within the ion channel 12 for defining an ion separation region 24 therebetween. The first electrode 20 is shaped and aligned so that the first electrode 20 encloses the separation region 24 within the ion channel 12 perpendicular to the axis 18. The second electrode 22 is shaped and aligned so that the second electrode 22 encloses the separation region 24 within the ion channel 12 perpendicular to the axis 18.

The trapped ion mobility separator 10 comprises a plurality of additional electrodes 26 (FIG. 1*b*, 1*c*). In the embodiment example, the ion channel 12 comprises nineteen additional electrodes 26, of which only one of the additional electrodes is provided with a reference sign for a better overview. The additional electrodes 26 have the same shape and alignment as the first electrode 20 and the second electrode 22. The additional electrodes 26 are located along the axis 18 at said ion channel 12 between the first electrode 20 and the second electrode 22. In particular, the additional electrodes 26 are spaced about 1 mm from each other and from the first electrode 20 and the second electrode 22, respectively. The additional electrodes 26 are connected by means of a resistor chain (not shown in the figure). The additional electrodes 26 are supplied with RF confining voltages to prevent the ions from escaping the ion channel 12 laterally, i.e., along the x and y directions. The first electrode 20, the second electrode 22 and the additional electrodes 26 together define the ion channel 12.

Figure 15:
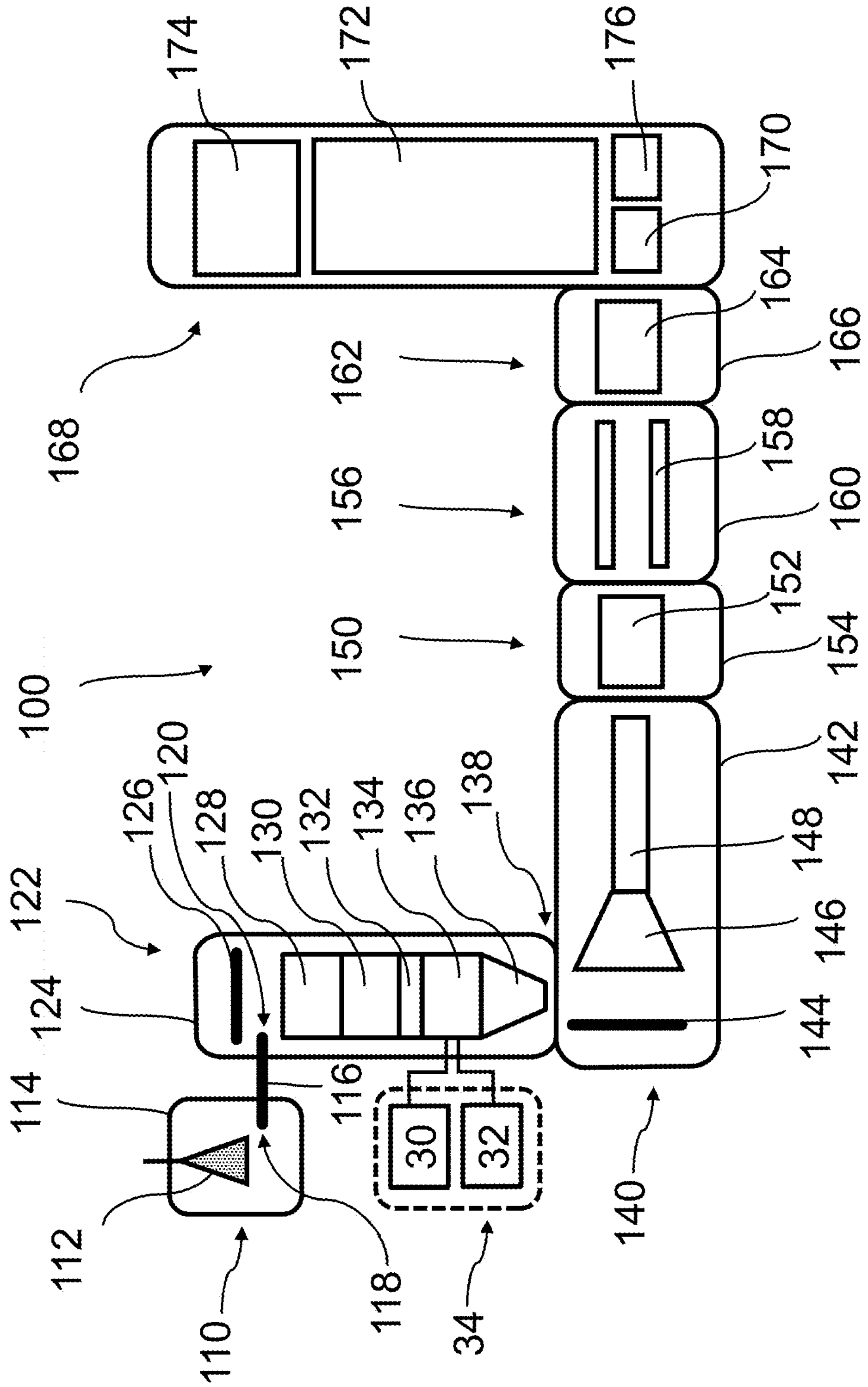
FIG. 15 shows a schematic diagram of a mass spectrometric system according to the invention.

The trapped ion mobility separator 10 comprises a first generator 30 (FIG. 15). The first generator 30 causes a first axial force to be exerted on the ions along the axis 18. To cause the first axial force the first generator 30 applies alternating separating voltages to the first electrode 20 and the second electrode 22, which generate an alternating axial electric field. The first axial force has an effect on the movement of the ions that is dependent on differential mobility by virtue of its interplay with the gas. Further, the trapped ion mobility separator 10 comprises a second generator 32 (FIG. 15). The second generator 32 causes a second axial force to be exerted on the ions along the axis 18. In the embodiment, to cause the second axial force the second generator 32 applies electric direct current (DC) voltages to the first electrode 20 and the second electrode 22, which generate an axial direct current field (DC field). The second axial force is counteracting the first axial force. In particular, the second axial force is counteracting the first axial force temporarily.

Further, the trapped ion mobility separator 10 comprises an electrical controller 34 (FIG. 15). The electrical controller 34 communicates with the first generator 30 and the second generator 32. The electrical controller 34 is set up to vary at least one of the first axial force and the second axial force over time.

In the embodiment example, the ion channel 12 has an elongate cross-sectional profile perpendicular to the axis 18, with a first dimension and a second dimension. In particular, the first dimension is longer than the second dimension. In the embodiment example, the ion channel 12 has the following dimensions: Along a longitudinal direction (z) along the axis 18 the ion channel 12 has a dimension of about 20 mm; in a first lateral direction (x), which extends perpendicular to the longitudinal direction (z), the ion channel 12 has a dimension of 60 mm; and in a second lateral direction (y), which also extends perpendicular to the longitudinal direction (z), the ion channel 12 has a dimension of 8 mm. That means, in the embodiment example, the extent of the ion channel 12 is much greater in one of the lateral directions than in the longitudinal direction, along which the ions move. For a better spatial assignment of the above described extension directions, a coordinate system is drawn in the FIG. 1*a*.

In the following, the mode of operation of the first embodiment of the trapped ion mobility separator 10 according to the invention is described:

Ions are introduced to the ion channel 12. In particular, the ions are introduced to the ion channel 12 at the first end 14 (representing the entrance region 15) of the ion channel 12. Thus, the ions are introduced (injected) into the ion channel 12 along the axis 18, along which they move between the first end 14 and the second end 16. In particular, that means, the ions are injected along that axis, along which they will be separated. Subsequently, the ions are guided to the separation region 24. The first axial force, that is imparted to the ions along the axis 18, is generated by the first generator 30, by applying alternating separating voltages to the first electrode 20 and the second electrode 22 to generate an alternating axial electric field. In the embodiment example, in the first time interval the generated alternating axial electric field is directed downstream in the separation region 24. In the second time interval the generated alternating axial electric field is directed upstream in the separation region 24. As the second time interval lasts longer than the first time interval, in total, the generated alternating axial electric field generates an upstream directed differential mobility drift within the separation region 24, or in other words, in total, the ions experience a net displacement towards the first end 14 of the ion channel 12. That means, in total, the first axial force leads to a movement of the ions towards the first end 14 of the ion channel 12. At substantially any time, the direction of the first axial force does not change along the axis 18 in the separation region 24. The potentials of the first electrode 20 and the second electrode 22 are distributed to the additional electrodes 26 via the resistor chain.

At the same time, the second axial force, that is imparted to the ions along the axis 18 and that counteracts the first axial force temporarily, is generated by the second generator 32, by applying compensation voltages to the first electrode 20 and the second electrode 22 to generate an electric compensation field. In particular, in the embodiment example, the second generator 32 applies electric DC voltages to the first electrode 20 and the second electrode 22 to generate an axial direct current field (DC field). In the embodiment example, the generated axial DC field is directed downstream. That means, the generated axial DC field generates a downstream mobility drift (DC field drift), or in other words, the movement of the ions caused by the axial DC field is directed towards the second end 16 of the ion channel 12. The compensation potentials of the first electrode 20 and the second electrode 22 are distributed to the additional electrodes 26 via the resistor chain.

At the same time, radially confining RF voltages are applied to the first electrode 20, the second electrode 22 and the additional electrodes 26 for preventing the ions from escaping the ion channel 12 laterally.

The alternating separating voltages, applied by the first generator 30 are applied so that for a first time interval an electric field with a first field strength is generated, and for a second time interval, following the first time interval, an opposing electric field with a second field strength is generated. Thereby, the second field strength is lower in magnitude than the first field strength. The first time interval lasts a shorter time span than the second time interval, such that the ions are trapped and separated along the axis 18 by a force equilibrium of the first axial force and the second axial force.

In the embodiment example, the first time interval corresponds to one third of one period of the alternating separating voltage and the second time interval corresponds to two thirds of one period of the alternating separating voltage. In particular, the first time interval lasts for about 3.33 μs and the second time interval lasts for about 6.66 μs.

In the embodiment example, in the first time interval the first generator 30 applies the alternating separating voltage so that the potential difference between the first and second electrode (voltage) is 700 V. In the second time interval, the first generator 30 applies the alternating separating voltage so that the potential difference is −350 V. In particular, in the first time interval a voltage of 350 V is applied to the first electrode 20 and a voltage of −350 V is applied to the second electrode 22. In particular, in the second time interval a voltage of −175 V is applied to the first electrode 20 and a voltage of 175 V is applied to the second electrode 22.

In the embodiment example, a rectangular voltage is applied as separating voltage. Further, in the embodiment example, the applied alternating separating voltage has a frequency of 100 kHz. In the embodiment example, the alternating axial electric field generated by the first generator 30 has a strength of 200 Td, thus representing an electric field strength to particle density ratio at which the ion mobility has a considerable non-linear dependence on the electric field.

Thus, in the embodiment example, the first axial force effects a movement of the ions which is dependent on the differential mobility of the ions, while the second axial force effects a movement of the ions which is dependent on the mobility of the ions. It should be mentioned at this point that, for example, a gas flow would cause a movement of the ions that does not depend on the mobility of the ions (or in other words, a velocity of the movement of the ions caused by the gas flow does not depend on the mobility of the ions).

At least one of the first axial force and the second axial force is varied over time by the electric controller 34. In the embodiment example, the first axial force or the second axial force is varied such that the second axial force is increased relative to the first axial force. In the embodiment example, the second axial force is increased in a few steps. By doing this, the trapped ions are driven progressively to the second end 16 of the ion channel 12, representing the exit region 17, as a function of their differential mobility. Thus, the ions elute at the second end 16 of the ion channel 12 in fractions, each comprising a range of ion species with different differential mobilities.

In the embodiment example, the trapped ion mobility separator 10 is operated at a gas pressure of 5 mbar.

Figure 2:
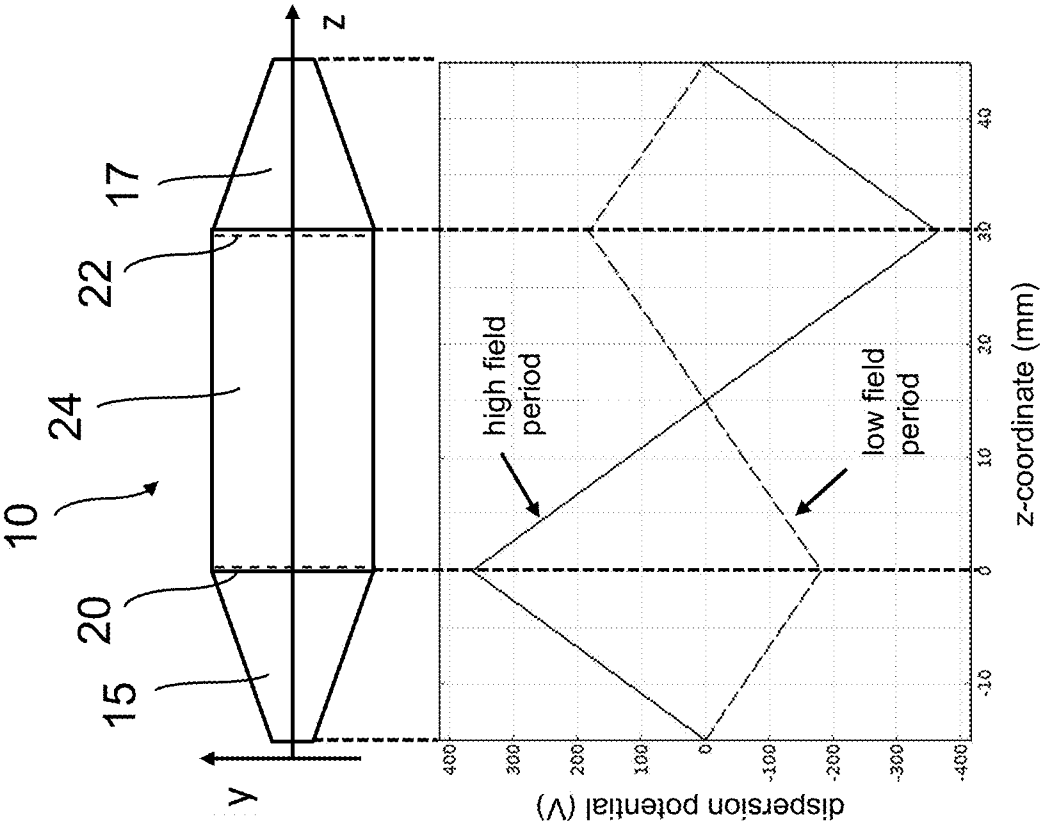
FIG. 2 presents a profile of the dispersion potential along the longitudinal direction of the ion channel.

FIG. 2 presents a profile of the dispersion potential along the longitudinal direction (z) of the ion channel 12. This potential relates to the alternating separating voltage, causing the first axial force. For better overview, a geometric longitudinal section view of the ion channel 12 along the axis 18 (y-z view) is illustrated on top of the profile, beginning at the first end 14 of the ion channel 12 and ending at the second end 16 of the ion channel 12, and presenting the positions of the first electrode 20 and the second electrode 22 within the ion channel 12.

On the ordinate the dispersion potential (V) is shown, and on the abscissa the z-coordinate (mm), representing the extension of the ion channel 12 in the longitudinal direction, is shown. The solid drawn line represents the potentials (V) at the first electrode 20 and at the second electrode 22 during the first time interval, and the dashed line represents the potentials (V) at the first electrode 20 and at the second electrode 22 during the second time interval. Actually, the second time interval is following on the first time interval. However, as the potentials for both time intervals are plotted simultaneous in the figure, or in other words time independent, the unit of the ordinate is termed as "dispersion potential" instead of "potential".

As can be seen in the figure, in the first time interval (represented by the solid drawn line) an electric field with a first field strength is generated, and for the second time interval (represented by the dashed line) an opposing electric field with a second field strength is generated, which is lower in magnitude than the first field strength. In particular, in the embodiment example, in the first time interval a voltage of 350 V is applied to the first electrode 20 and a voltage of −350 V is applied to the second electrode 22, and in the second time interval a voltage of −175 V is applied to the first electrode 20 and a voltage of 175 V is applied to the second electrode 22.

Further, as can be seen in the figure, in the first time interval (represented by the solid drawn line), an electric field is generated, which is directed downstream within the separation region 24, whereas it is directed upstream within the entrance region 15 and within the exit region 17. In the second time interval (represented by the dashed line), an electric field is generated, which is directed upstream within the separation region 24, whereas it is directed downstream within the entrance region 15 and within the exit region 17.

Figure 3:
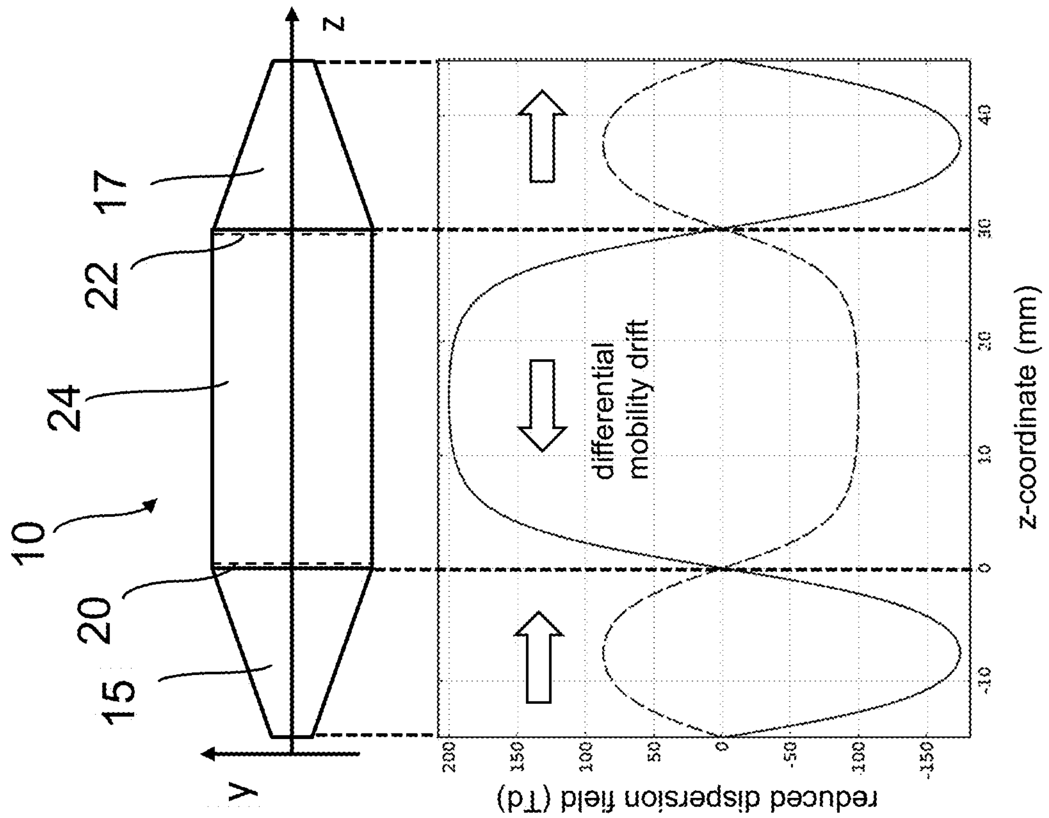
FIG. 3 presents a profile of the dispersion field along the longitudinal direction of the ion channel.

FIG. 3 presents a profile of the reduced dispersion field along the longitudinal direction (z) of the ion channel 12. Principally, the dispersion field is the spatial derivation of the dispersion potential. In the context of the disclosure, the term "dispersion field" shall represent the above-described alternating axial electric field. Thus, this reduced dispersion field corresponds to the first axial force. Again, for better overview, a geometric longitudinal section view of the ion channel 12 along the axis 18 (y-z view) is illustrated on top of the profile, beginning at the first end 14 of the ion channel 12 and ending at the second end 16 of the ion channel 12, and presenting the positions of the first electrode 20 and the second electrode 22 at the ion channel 12.

On the ordinate the reduced dispersion field (Td) is shown, and on the abscissa the z-coordinate (mm), representing the extension of the ion channel 12 in the longitudinal direction, is shown. The alternating separating voltages applied to the first electrode 20 and to the second electrode 22 generate a dispersion field Ed during the first time interval and the second time interval. The reduced dispersion field (Td) describes the ratio of electric field strength and particle density. The solid drawn line represents the reduced dispersion field (Td) during the first time interval, and the dashed line represents the reduced dispersion field (Td) during the second time interval. Actually, the second time interval follows on the first time interval. However, as the applied reduced field for both time intervals are plotted simultaneous in the figure, or in other words time independent, the unit of the ordinate is termed as "reduced dispersion field" instead of "reduced field". Further, the mobility drift of the ions, resulting from the alternating electric field, is displayed in the figure.

As can be seen in the figure, the time-dependent dispersion field causes different differential mobility drifts (represented by arrows) within the separation region 24 of the ion channel 12 and within the entrance region 15 or within the exit region 17 of the ion channel 12. The differential mobility drift within the separation region 24 is directed upstream. The differential drifts within the entrance region 15 and within the exit region 17 are directed downstream.

Figure 6:
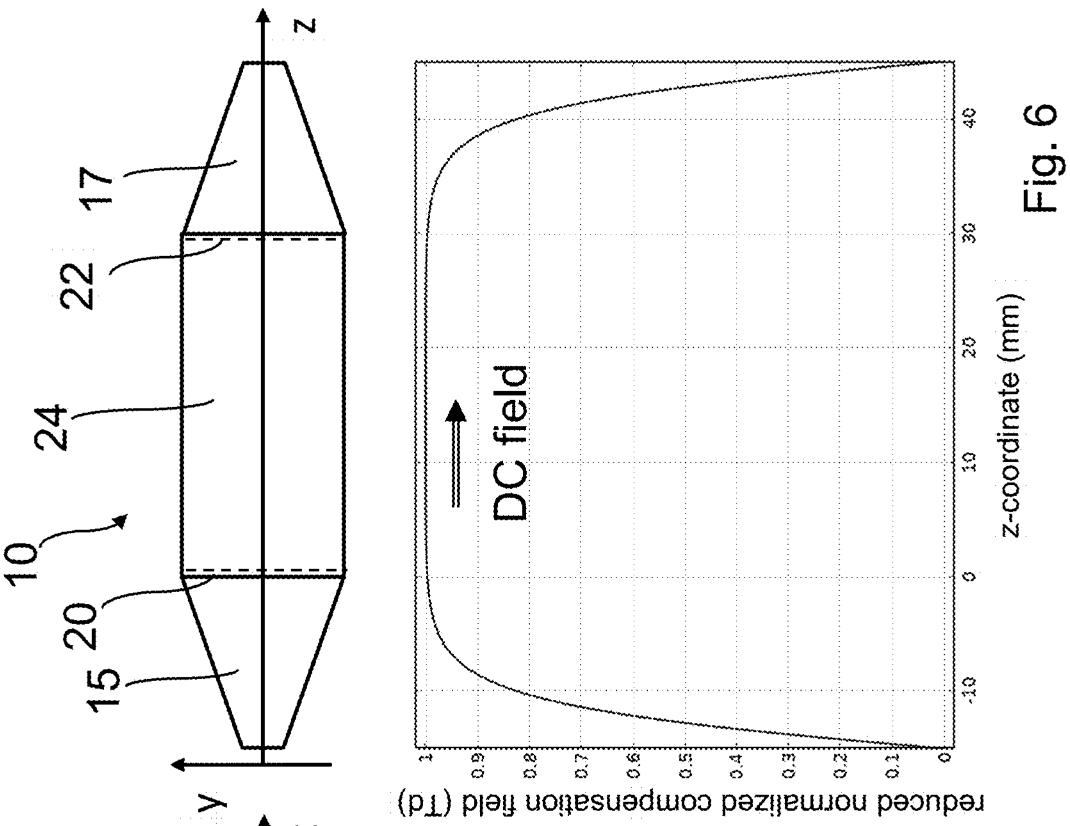
FIG. 6 presents a profile of the normalized compensation field along the longitudinal direction of the ion channel.

The differential mobility drift velocity depends in a nonlinear way on the strength of the dispersion field Ed. In the transition between the entrance region 15 of the ion channel 12 and the separation region 24 of the ion channel, the differential mobility drift velocity exhibits a gradient which is used for the spatial separation and trapping of the ions. The dispersion field Ed is spatially constant in the middle of the separation region 24 of the ion channel 12, which forms a kind of plateau region of the "differential mobility barrier". The first axial force (dispersion field, differential mobility drift velocity) rises from the first electrode 20 to a plateau region between the first electrode 20 and the second electrode 22 (FIG. 3). The second force (compensation field) is spatially uniform between the first electrode 20 and the second electrode 22 (FIG. 6). The differential mobility drift and the DC drift move the ions towards the first electrode 20. An ion species gets trapped at a position downstream of the first electrode 20 where the differential mobility drift velocity equals the DC field drift velocity.

Figure 4B:
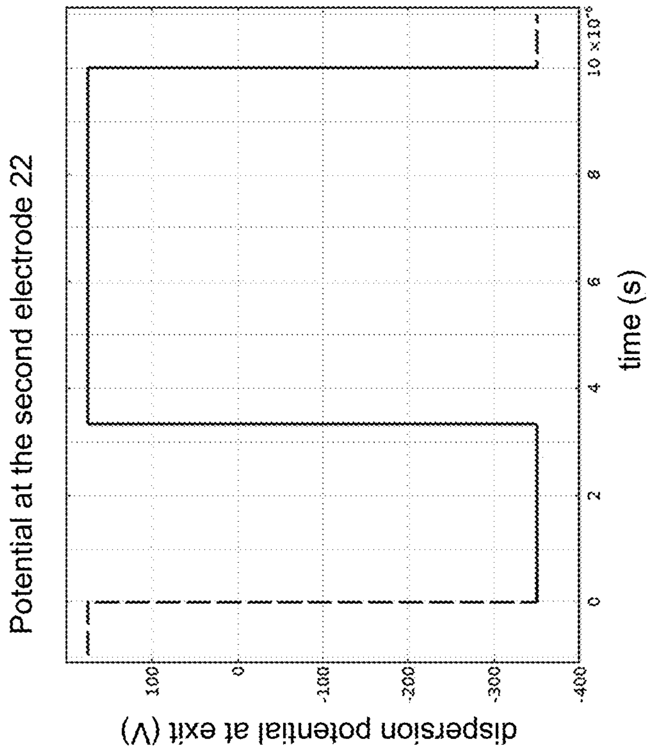
FIG. 4*b* presents a temporal profile of the dispersion potential presented in FIG. 2, at the second electrode.
Figure 4A:
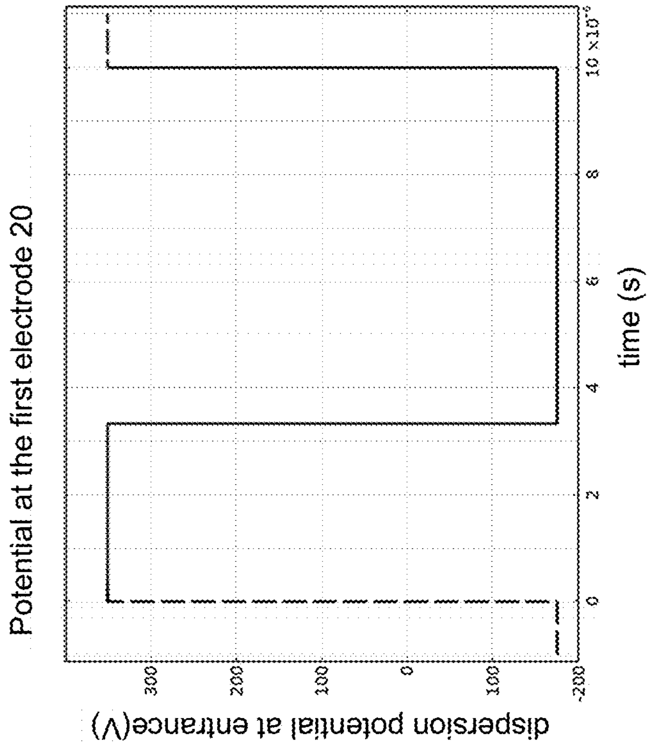
FIG. 4*a* presents a temporal profile of the dispersion potential presented in FIG. 2, at the first electrode.

FIG. 4*a* (left) presents a temporal profile of the dispersion potential presented in FIG. 2 at the first electrode 20. FIG. 4*b* (right) presents a temporal of the dispersion potential presented in FIG. 2 at the second electrode 22.

In FIG. 4*a* (left) on the ordinate, the dispersion potential (V) at the first electrode 20 is shown, and on the abscissa the time(s) is shown. The first electrode 20 is assigned to the first end 14 of the ion channel 12, which represents an entrance region for ions. In FIG. 4*b* (right) on the ordinate, the dispersion potential (V) at the second electrode 22 is shown, and on the abscissa the time(s) is shown. The second electrode 22 is assigned to the second end 16 of the ion channel 12, which represents an exit region for ions.

As can be seen in the figure, a rectangular voltage is applied to the first electrode 20 and to the second electrode 22. The solid drawn line corresponds to one period of the alternating separating voltage. The dashed line corresponds to another period of the alternating separating voltage. The maximum potential at the first electrode 20 is about 350V. The minimum potential at the second electrode 22 is about −350 V. In the embodiment example, the applied alternating separating voltage has a frequency of 100 KHz.

Figure 5:
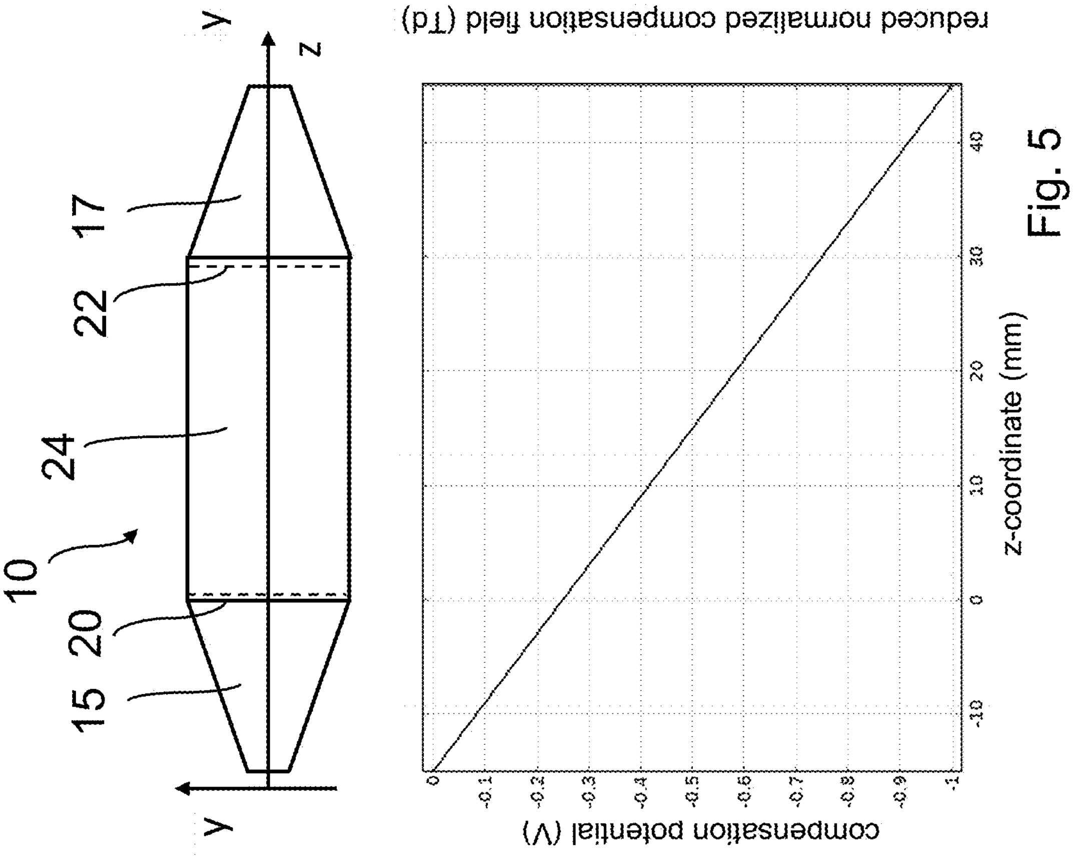
FIG. 5 presents a profile of the compensation potential along the longitudinal direction of the ion channel.

FIG. 5 presents a profile of the compensation potential along the longitudinal direction (z) of the ion channel 12. This potential relates to the compensation voltage, causing the second axial force. Again, for better overview, a geometric longitudinal section view of the ion channel 12 along the axis 18 (y-z view) is illustrated on top of the profile, beginning at the first end 14 of the ion channel 12 and ending at the second end 16 of the ion channel 12, and presenting the positions of the first electrode 20 and the second electrode 22 at the ion channel 12.

On the ordinate the compensation potential (V) is shown, and on the abscissa the z-coordinate (mm), representing the extension of the ion channel 12 in the longitudinal direction, is shown. In the embodiment example, the compensation potentials generate an axial direct current field.

As can be seen in the figure, an axial direct current field is generated, which is directed downstream over the entire length (z direction) of the ion channel 12, including the separation region 24 as well as the entrance region 15 and the exit region 17.

FIG. 6 presents a profile of the normalized compensation field along the longitudinal direction (z) of the ion channel 12. This normalized compensation field corresponds to the second axial force. Again, for better overview, a geometric longitudinal section view of the ion channel 12 along the axis 18 (y-z view) is illustrated on top of the profile, beginning at the first end 14 of the ion channel 12 and ending at the second end 16 of the ion channel 12, and presenting the positions of the first electrode 20 and the second electrode 22 at the ion channel 12.

On the ordinate the normalized reduced compensation field (Td) is shown, and on the abscissa, the z-coordinate (mm), representing the extension of the ion channel 12 in the longitudinal direction, is shown. The compensation voltages applied to the first electrode 20 and to the second electrode 22 generate a compensation field Ec. The reduced compensation field (Td) describes the ratio of electric compensation field strength and particle density. Here, the reduced dispersion field is normalized to 1 Td. In the embodiment example, the normalized reduced compensation field (Td) is a normalized reduced axial direct current field.

As can be seen in the figure, the compensation field or the normalized reduced compensation field is spatially constant. Further, the compensation field or the normalized reduced compensation field generates a downstream axial direct current field drift (represented by an arrow). This axial direct current field drift counteracts the upstream differential mobility drift (FIG. 3) generated by the dispersion field Ed.

Figure 7A:
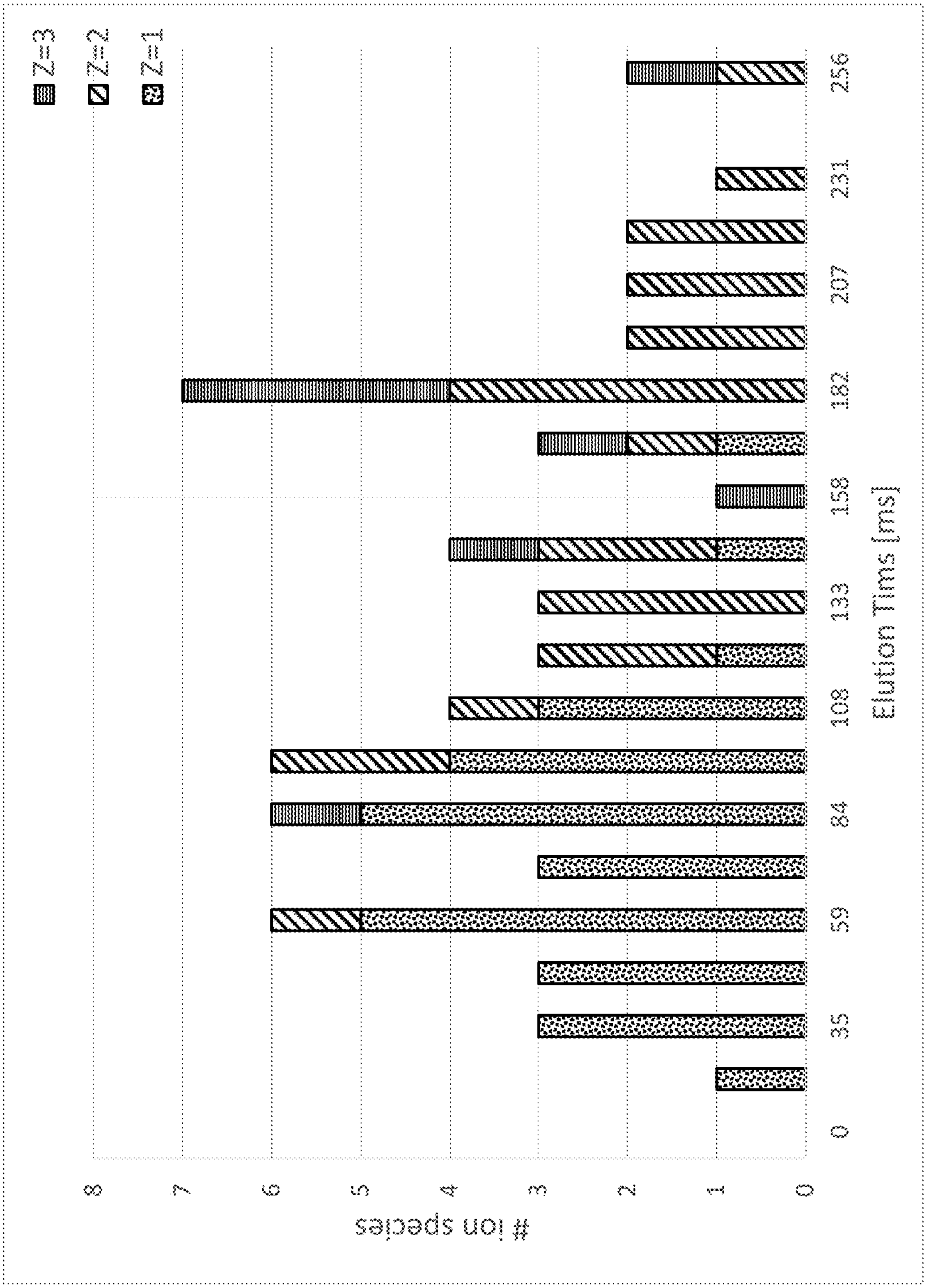
FIG. 7*a* shows a simulation result, outlining the number of ions for different elution times according to their charge state Z.
Figure 7B:
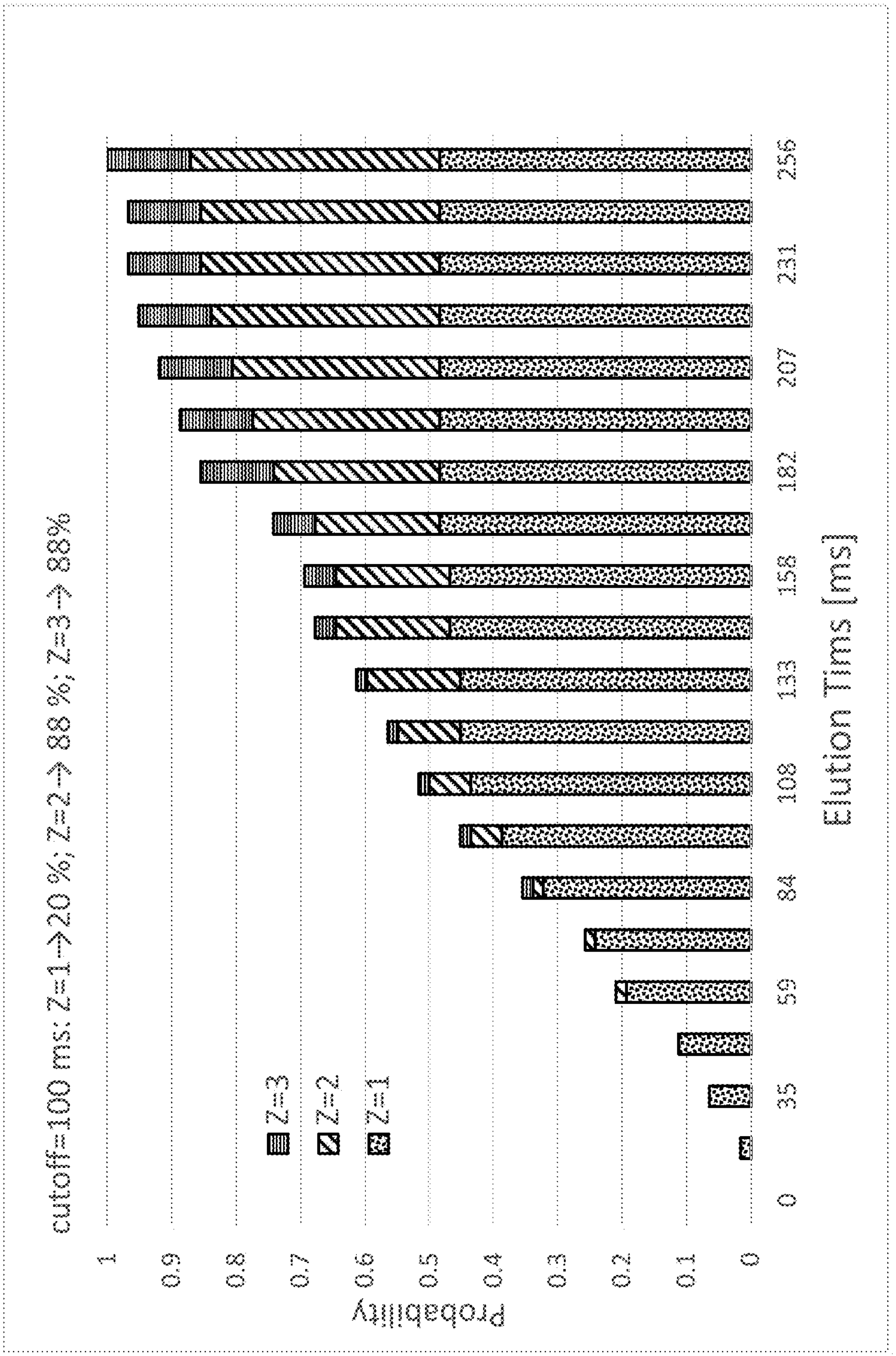
FIG. 7*b* shows a simulation result, outlining the probability for ions eluting at different elution times according to their charge state Z.

FIG. 7*a* shows a simulation result, outlining the number of ions for different elution times according to their charge state Z. FIG. 7*b* shows a simulation result, outlining the probability for ions eluting at different elution times according to their charge state Z.

In the simulation, the motion of a peptide ion species of data published in an ASMS poster (2013 Ridgeway et al., ASMS Conference on Mass Spectrometry and Allied Topics: "Maximizing Gas Phase Peak Capacity While Minimizing Analysis Time Through") is calculated. The simulation was performed using the above described dispersion field ENd and compensation field ENc (as described with reference to the FIGS. 1 to 6), while the compensation field ENc is increased in small steps during the scan time. The compensation field ENc is scanned from 1.8 Td to 5.0 Td in 250 ms. The data comprise low- and high field mobility of 62 BSA digest peptides.

As can be seen in the FIGS. 7*a*, 7*b*) the ion species with charge state Z=1 primarily elute prior to the ion species with higher charge states. The dTIMS could therefore be used to separate and eliminate the ion species with Z=1 from ion species with Z>1. The fraction of ion species eluting prior to 100 ms comprises 80% of the ion species with Z=1, but only 12% of the ion species with Z>1.

Figure 8B:
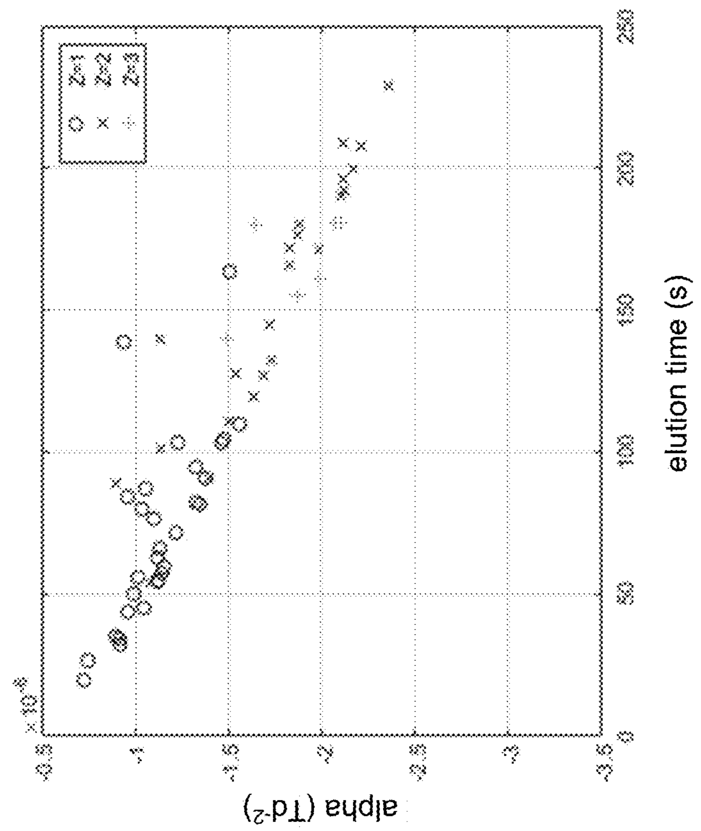
FIG. 8*b* shows a simulation result, outlining the differential mobility of ions over elution time according to their charge state Z.
Figure 8A:
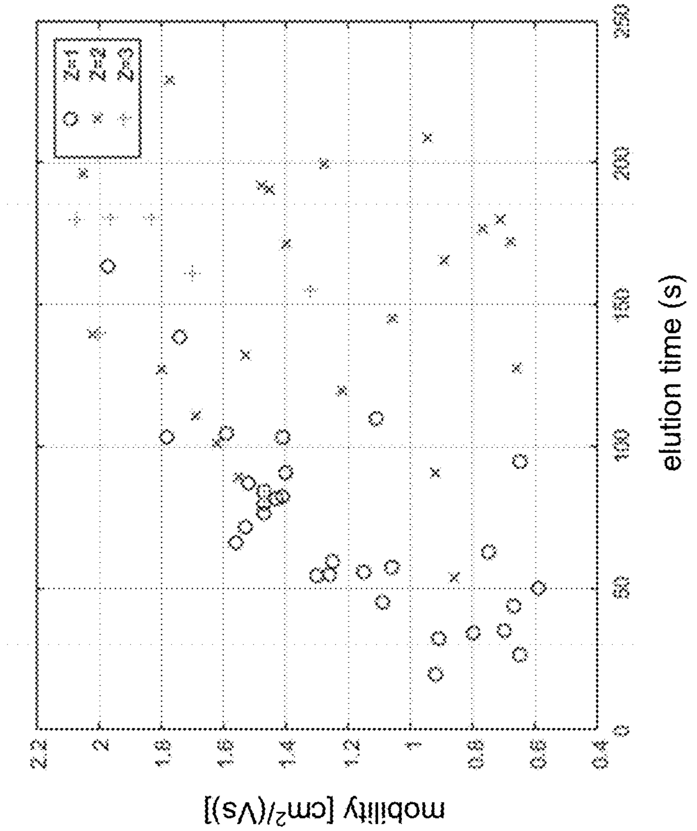
FIG. 8*a* shows a simulation result, outlining the mobility of ions over elution time according to their charge state Z.

FIG. 8*a* (left) shows a simulation result, outlining the mobility of ions over elution time according to their charge state Z. FIG. 8*b* (right) shows a simulation result, outlining the differential mobility of ions over elution time according to their charge state Z.

The data presented here complement the simulation results shown in FIGS. 7*a*, 7*b*. As can be seen in the FIGS. 8*a*, 8*b*, there is no correlation between elution time and low-field mobility, but a clear correlation between elution time and differential mobility (first non-linear coefficient). This result clarifies, that the dTIMS adds an additional separation dimension compared to the trapped ion mobility separator constructed and operated to disperse ions according to ion mobility, preferably in the low field limit.

Figure 9:
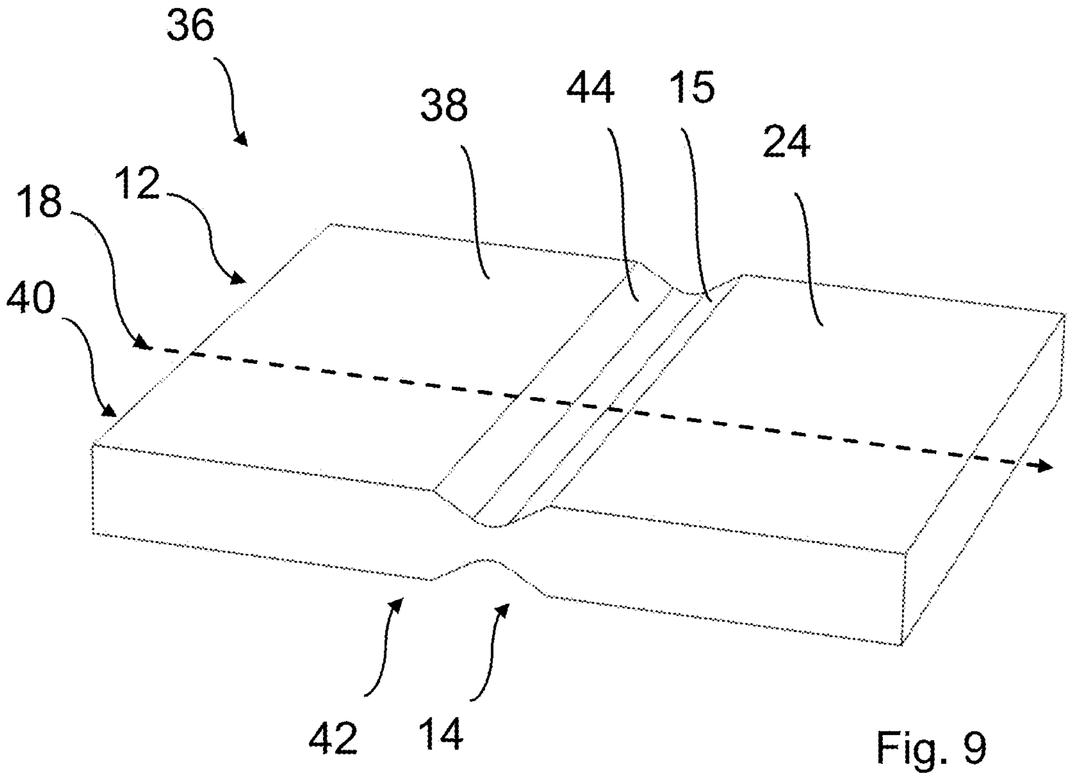
FIG. 9 shows a schematic perspective view of a second embodiment of a trapped ion mobility separator according to the invention.

FIG. 9 shows a schematic perspective view of a second embodiment of a trapped ion mobility separator 36 according to the invention. The trapped ion mobility separator 36 is a differential trapped ion mobility separator (dTIMS). The trapped ion mobility separator 36 essentially corresponds to the trapped ion mobility separator 10 from FIG. 1*a* in terms of its structure and mode of operation. Identical elements are provided with the same reference signs. In this respect, reference is also made to the preceding description.

The trapped ion mobility separator 36 differs from the trapped ion mobility separator 10 from FIG. 1*a* in that the trapped ion mobility separator 36 comprises an ion trap 38. The ion trap 38 is located upstream of the separation region 24 within the ion channel 12. In particular, the ion trap 38 is located upstream of the entrance region of the separation region 24 within the ion channel 12. The ion trap 38 is set up for storing ions. In particular, one batch of ions can be accumulated in the ion trap 38, while simultaneously another batch of ions is being separated in the separation region 24. The ion trap 38 has a first end 40. Further, the ion trap 38 has a second end 42, facing away from the first end 40 and facing the entrance region 15 of the separation region 24.

Further, the trapped ion mobility separator 36 comprises a transfer region 44. The transfer region 44 is located at the second end 42 of the ion trap 38. In particular, the transfer region 44 is located between the ion trap 38 and the entrance region 15 of the separation region 24. The transfer region 44 provides a connection between the ion trap 38 and the separation region 24. In particular, the transfer region 44 is set up for transferring ions from the ion trap 38 into the separation region 24. The transfer region 44 is shaped tapered. Due to this taper shaping of the transfer region 44, the effect of the strong electric fields of the trapped ion mobility separator 36 on the upstream located ion trap 38 is minimized.

Comparable to the trapped ion mobility separator 10, the first axial force is caused by the first generator by applying the above-mentioned alternating separating voltages to the first electrode and to the second electrode to generate the above-mentioned alternating axial electric field. The second axial force, counteracting the first axial force temporarily, is caused by the second generator by applying electric DC voltages to the first electrode and the second electrode to generate an axial direct current field (DC field). In the trapped ion mobility separator 36, the first axial force comprises a spatial gradient along the longitudinal (z) direction. The second axial force is constant at the gradient of the first axial force.

Along the longitudinal direction (z) the ion channel 12 of the trapped ion mobility separator 36 has a dimension of 40 mm. This extension of the dimension compared to the trapped ion mobility separator 10 from FIG. 1*a* results from the additional, upstream located ion trap 38. In the first lateral direction (x) the ion channel 12 has a dimension of 60 mm, and in the second lateral direction (y) the ion channel 12 has a dimension of 8 mm.

In the embodiment example, a rectangular voltage is applied as separating voltage. Further, in the embodiment example, the applied alternating separating voltage has a frequency of 100 kHz. The alternating axial electric field generated by the first generator 30 has a maximum strength of 200 Td. In the embodiment example, the trapped ion mobility separator 36 is operated at a gas pressure of 5 mbar.

For a better overview, the second end 16, representing an exit region 17 for the ions, the first electrode 20, the second electrode 22, and the additional electrodes 26 are not shown in this FIG. 9.

Figure 10A:
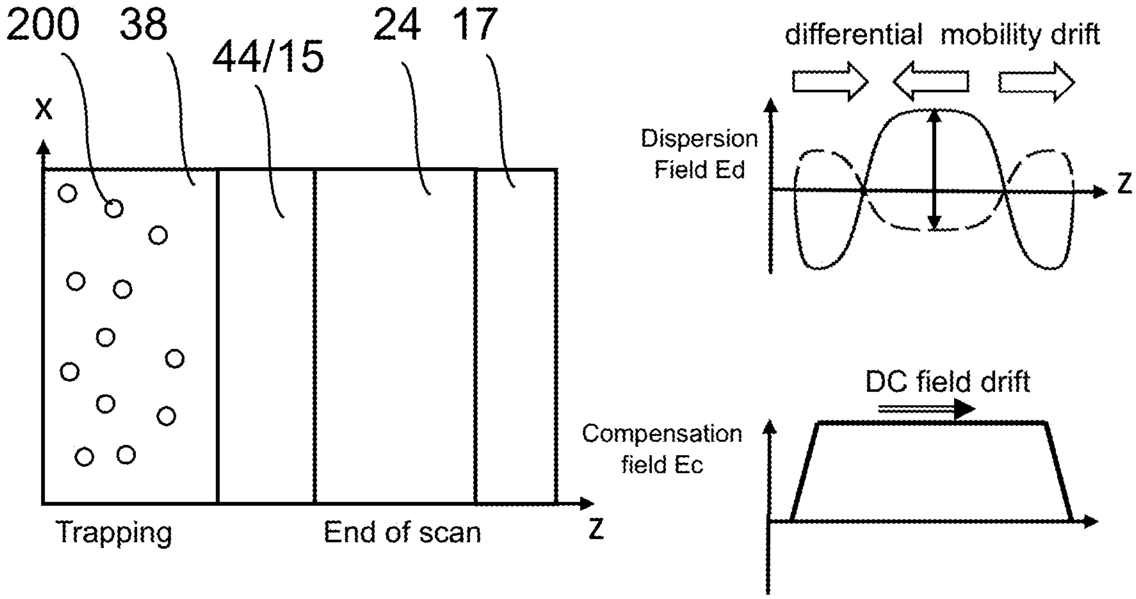
FIG. 10*a* shows schematically the working principle of the second embodiment of the trapped ion mobility separator according to the invention, referring to a first point in time during the analysis process.
Figure 10B:
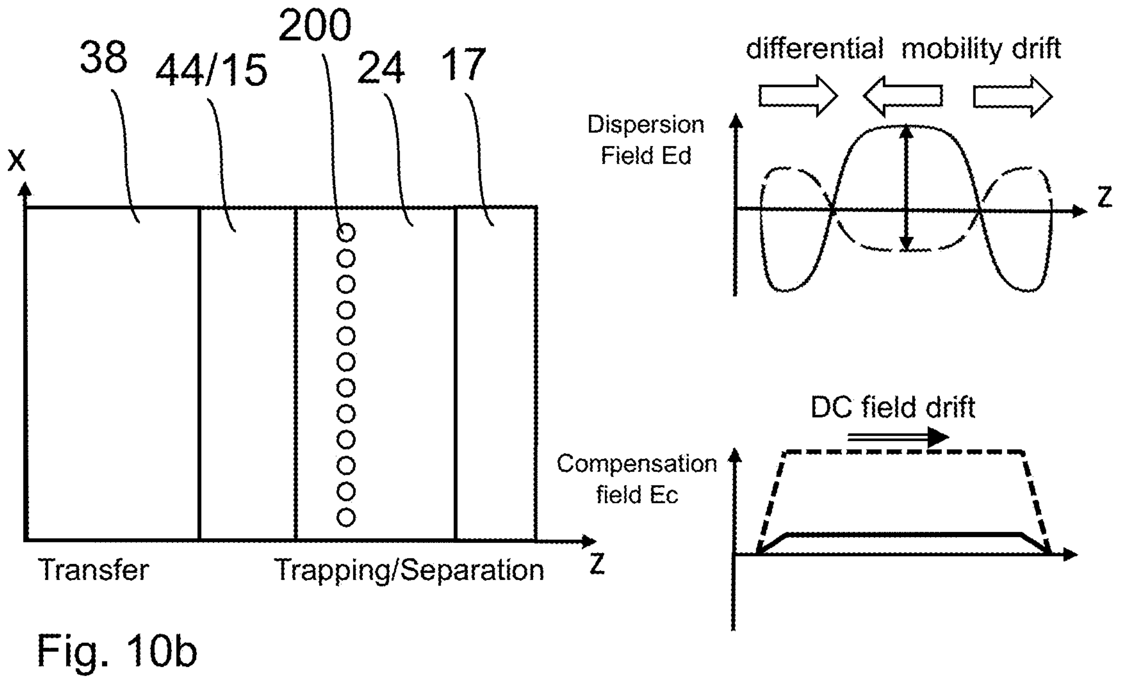
FIG. 10*b* shows schematically the working principle of the second embodiment of the trapped ion mobility separator according to the invention, referring to a second point in time during the analysis process.
Figure 10C:
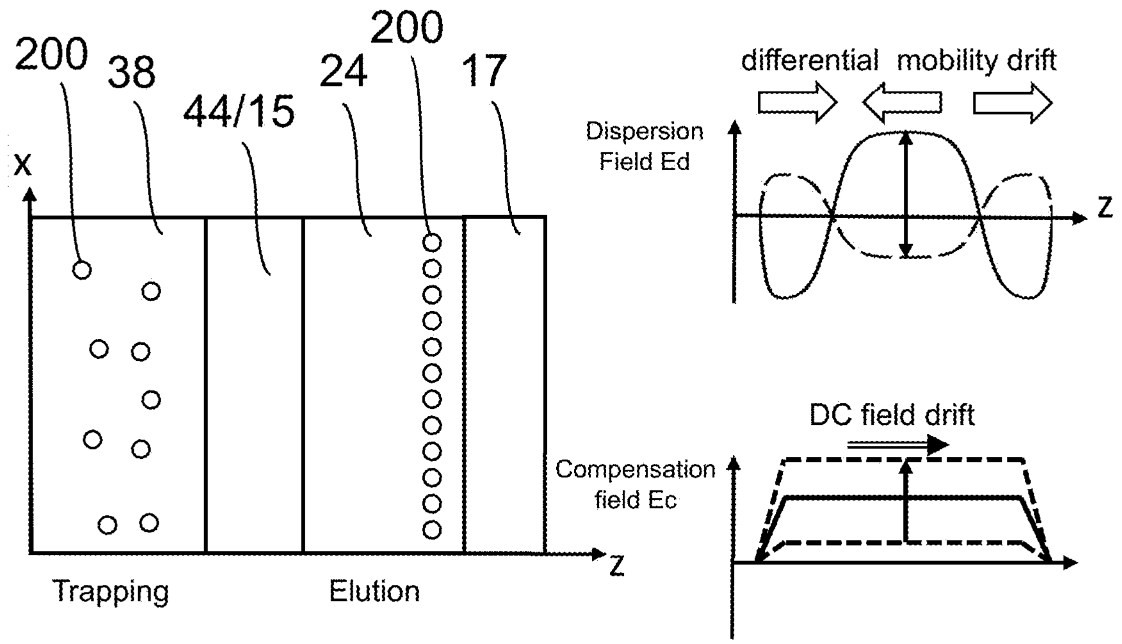
FIG. 10*c* shows schematically the working principle of the second embodiment of the trapped ion mobility separator according to the invention, referring to a third point in time during the analysis process.

FIG. 10 shows schematically the working principle of the second embodiment of the trapped ion mobility separator 36 according to the invention at different points in time during the analysis process (FIG. 10*a*, 10*b*, 10*c*). On the left side of the respective figures, schematically the location and distribution of the ions within the ion channel is shown for the respective time point; on the right side (top), the generated reduced dispersion field Ed (first axial force) along the longitudinal direction (z) of the separation region 24 is shown for the corresponding time point; and on the right side (bottom), the generated compensation field Ec (second axial force) along the longitudinal direction (z) of the separation region 24 is shown for the corresponding time point.

The generated reduced dispersion field Ed along the longitudinal direction (z) of the separation region 24 shown on the right side (top) is presented only for overview, as the alternating axial electric field only changes as already represented by the two lines of the "dispersion field".

FIG. 10*a* refers to a first selected point in time. As can be seen in FIG. 10*a*, left side, ions 200 (schematically presented as circles; for a better overview, only one ion 200 is provided with a reference sign) are trapped and distributed in the ion trap 38, located upstream of the separation region 24 within the ion channel 12 of the trapped ion mobility separator 36. The ions 200 are trapped in the ion trap 38 by applying direct current voltages to an entrance and an exit of the ion trap 38. As can be seen in FIG. 10*a*, right side, the generated compensation field Ec is at the maximum level.

FIG. 10*b* refers to a second selected point in time. As can be seen in FIG. 10*b*, left side, the ions 200 (for a better overview, only one ion 200 is provided with a reference sign) are transferred from the ion trap 38 to the separation region 24, which is located downstream of the ion trap 38 within the ion channel 12 of the trapped ion mobility separator 36. The ions 200 are transferred by switching the DC field in the ion trap 38. The downstream differential drift in the transfer region 44 assists the transfer of the ions 200. The ions 200 are trapped and separated in the separation region 24 according to their differential mobility. As can be seen FIG. 10*b*, right side, the generated compensation field Ec is at the minimum level.

FIG. 10*c* refers to a third selected point in time. As can be seen in FIG. 10*c*, left side, fresh ions 200 (for a better overview, only one ion 200 is provided with a reference sign) are trapped and distributed in the ion trap 38 of the trapped ion mobility separator 36. The previously transferred ions 200 are ejected from the separation region 24 and from the trapped ion mobility separator 36 in total, according to their differential mobility, by step-wise (or continuously) increasing the compensation field Ec to its maximum value, as can be seen in FIG. 10*c*, right side.

Figure 11A:
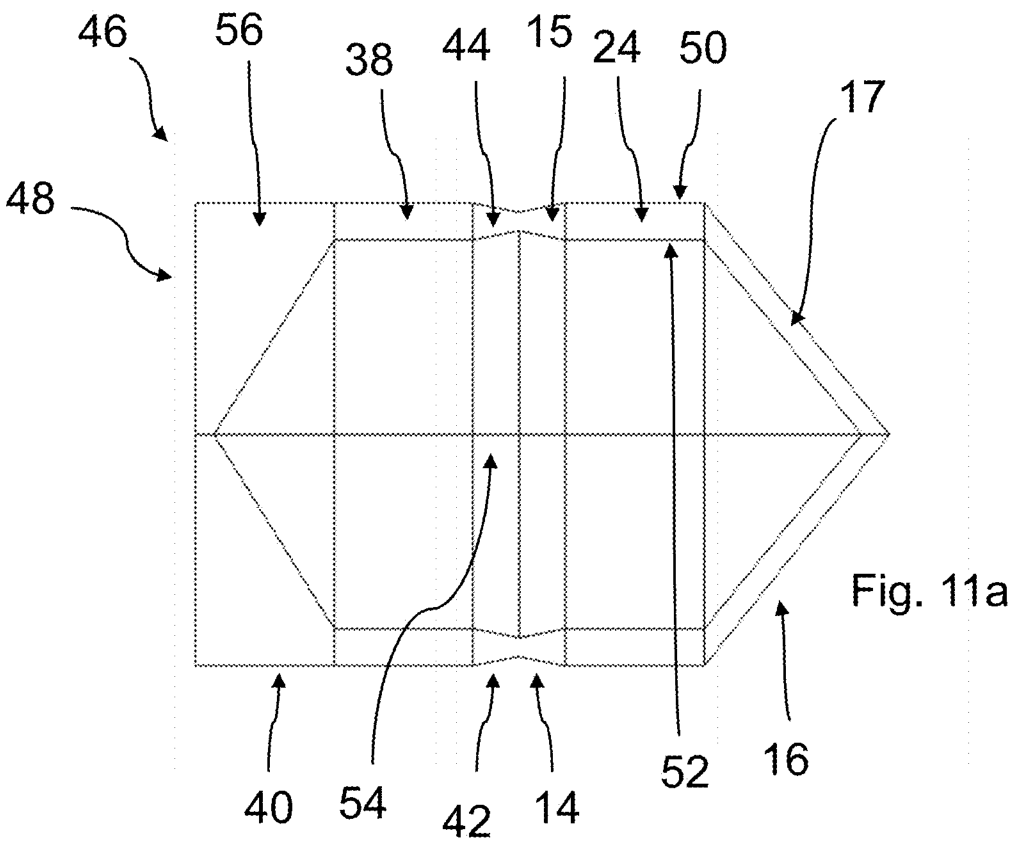
FIG. 11*a* shows a schematic longitudinal sectional view of a third embodiment of a trapped ion mobility separator according to the invention.
Figure 11B:
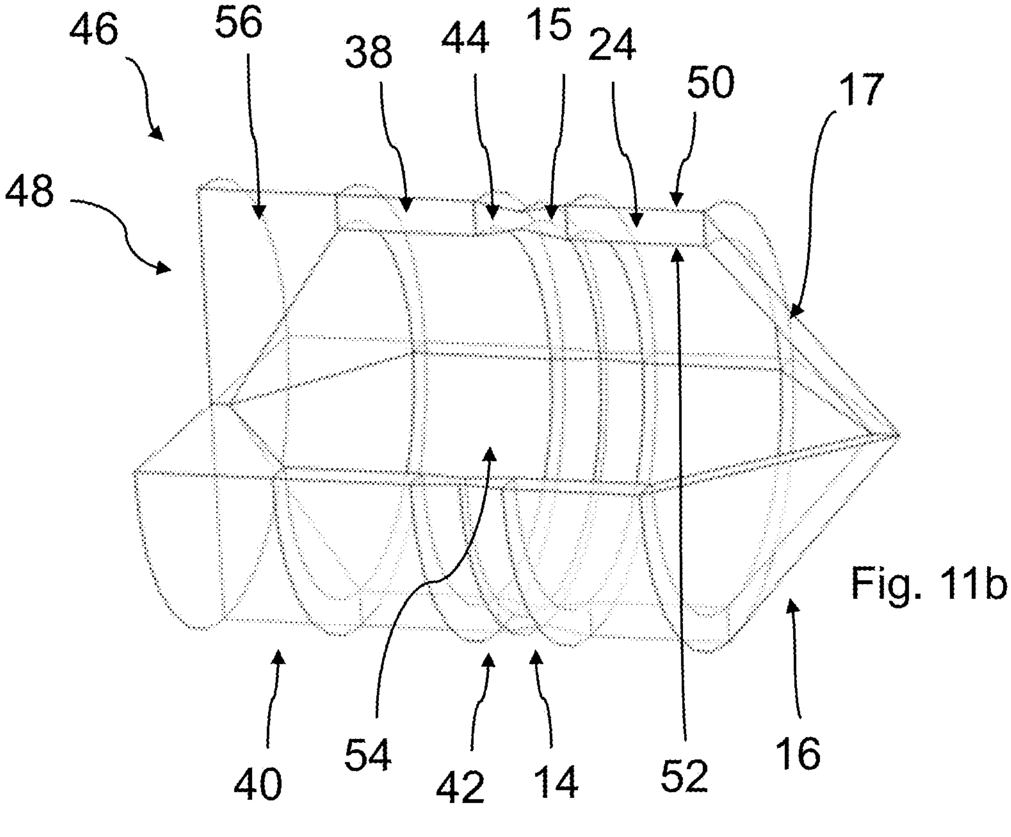
FIG. 11*b* shows a schematic perspective view of the third embodiment of the trapped ion mobility separator (cut-open)

FIG. 11*a* shows a schematic longitudinal sectional view of a third embodiment of a trapped ion mobility separator 46 according to the invention, and FIG. 11*b* shows a schematic perspective view of the third embodiment of the trapped ion mobility separator. The trapped ion mobility separator 46 is a differential trapped ion mobility separator (dTIMS). The trapped ion mobility separator 46 essentially corresponds to the trapped ion mobility separator 36 in terms of its structure and mode of operation. Identical elements are provided with the same reference signs. In this respect, reference is also made to the preceding description. In the view of the FIG. 11*b* a part of the ion channel is omitted, so that an interior 54 of the trapped ion mobility separator 46 can be seen. For a better understanding, FIG. 11*b* is presented transparently.

The trapped ion mobility separator 46 differs from the trapped ion mobility separator 36 from FIG. 9 in that the trapped ion mobility separator 46 has an ion channel 48 with a circular cross-sectional profile along the axis 18. In the embodiment example, the ion channel 48 has a diameter of 50 mm. The ion channel 48 has an exterior wall 50. The exterior wall 50 represents an outer radius of the ion channel 48. Further, the ion channel 48 has an interior wall 52. The interior wall 52 represents an inner radius of the ion channel 48. Between the outer radius and the inner radius, a gap is provided. The gap represents an annulus, i.e., the difference between the outer radius and the inner radius. The annulus has a dimension of 8 mm, which represents the thickness of the annulus. The ions are radially confined within the annulus. Confining the ions within the annulus, the trapped ion mobility separator 46 is provided with an increased charge capacity, compared to the already high charge capacity provided by the trapped ion mobility separators 10 from FIGS. 1*a* and 36 from FIG. 9, due to their extension of one of the lateral directions of the ion channel 12. In the longitudinal direction (z) the ion channel 48 has a dimension of 30 mm. Inside an interior 54 of the interior wall 52, a vacuum is kept.

The trapped ion mobility separator 46 comprises an ion trap 38 within the ion channel 48, arranged like the ion trap 38 of the trapped ion mobility separator 36 from FIG. 9. The ion trap 38 has a first end 40. Further, the ion trap 38 has a second end 42, facing away from the first end 40 and facing the entrance region 15 of the separation region 24. The trapped ion mobility separator 46 comprises a transfer region 44. The transfer region 44 is located at the second end 42. The gap of the ion channel 48 is somewhat reduced in the transfer region 44/entrance region 15. These elements described above are provided with the same reference signs as used for the embodiment example of the trapped ion mobility separator 36 from FIG. 9, as they essentially correspond to the corresponding elements of the trapped ion mobility separator 36 in terms of their mode of operation. However, it is clear to the skilled person that they are adapted in their shaping to the shape of the ion channel 48 and the annulus.

Further, the trapped ion mobility separator 46 differs from the trapped ion mobility separator 36 in that it comprises a funnel 56. In particular, the funnel 56 is an entrance funnel, representing an entrance region for ions. The funnel 56 is located at the first end 40 of the ion trap 38. The funnel 56 is shaped tapered.

Comparably to the trapped ion mobility separator 36 from FIG. 9, in the trapped ion mobility separator 46, the first axial force comprises a spatial gradient along the longitudinal (z) direction. The second axial force is constant at the gradient of the first axial force.

In the embodiment example, a rectangular voltage is applied as separating voltage. Further, in the embodiment example, the applied separating voltage has a frequency of 100 kHz. The alternating axial electric field generated by the first generator 30 has a maximum strength of 200 Td. In the embodiment example, the trapped ion mobility separator 46 is operated at a gas pressure of 5 mbar.

For a better overview, the first electrode 20, the second electrode 22 and the additional electrodes 26 are not shown in this FIG. 11. However, the first electrode 20, the second electrode 22, the additional electrodes 26 are adapted in shape to the circular cross-sectional profile of the ion channel 48.

Figure 12:
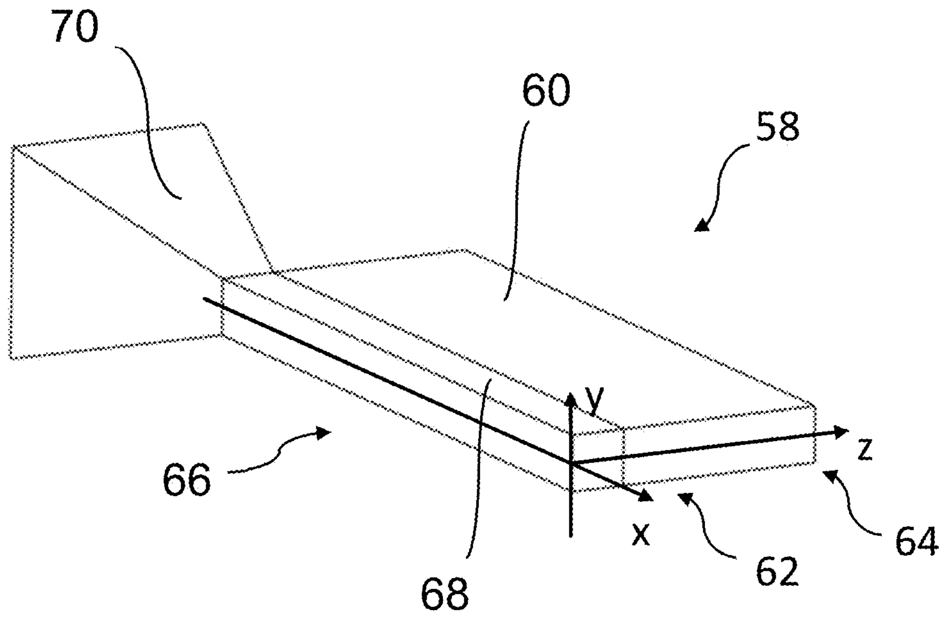
FIG. 12 shows a schematic perspective view of a fourth embodiment of a trapped ion mobility separator according to the invention.

FIG. 12 shows a schematic perspective view of a fourth embodiment of a trapped ion mobility separator 58 according to the invention. The trapped ion mobility separator 58 is a differential trapped ion mobility separator (dTIMS). The trapped ion mobility separator 58 essentially corresponds to the trapped ion mobility separator 10 from FIG. 1*a* in terms of its structure and mode of operation. Identical elements are provided with the same reference signs. In this respect, reference is also made to the preceding description.

The trapped ion mobility separator 58 shown in this embodiment example is preferably used for generating a small number of ion fractions, wherein one fraction substantially comprises ion species of a charge stage of Z=1.

The trapped ion mobility separator 58 differs from the trapped ion mobility separator 10 from FIG. 1*a* in that an entrance region for ions and an exit region for the ions are not assigned to two different ends and sides of the separation region in the trapped ion mobility separator 58. Instead, the ions are injected and eluted on the same side of a separation region 60. This allows that the separation region 60 can be by-passed in a transmission mode.

The separation region 60 has a first end 62. Further the separation region 60 has a second end 64. The second end 64 of the separation region 60 is designed closed. The trapped ion mobility separator 58 comprises an ion channel 66. The ion channel 66 comprises the separation region 60. Further the ion channel 66 comprises a transfer region 68. The transfer region 68 is located at the first end 62 of the separation region 60. Further, the trapped ion mobility separator 58 comprises a funnel 70. The funnel 70 represents an entrance funnel for ions. The funnel 70 is located adjacent to the transfer region 68. Thereby, the funnel 70 is arranged non-collinearly to the ion channel 66. In particular, an angle between an axis 72 (FIG. 13*a*) of the funnel 70 and the axis 18 of the ion channel is substantially 90° (exemplarily shown in FIG. 13*a*).

In contrast to the trapped ion mobility separator 10 from FIG. 1*a* (and in contrast to the trapped ion mobility separators 36 from FIGS. 9 and 46 from FIG. 11*a*), in the trapped ion mobility separator 58, the generated second axial force comprises a spatial gradient along the longitudinal (z) direction. The first axial force is constant at the gradient of the second axial force. For a better spatial assignment of the above described direction, a coordinate system is drawn in the FIG. 12.

In the embodiment example, a bi-sinusoidal voltage is applied as separating voltage. Further, in the embodiment example, the applied separating voltage has a frequency of 100 kHz. The alternating axial electric field generated by the first generator 30 has a maximum strength of 200 Td. In the embodiment example, the trapped ion mobility separator 58 is operated at a gas pressure of 2.5 mbar.

For a better overview, the first electrode 20, the second electrode 22 and the additional electrodes 26 are not shown in this FIG. 12.

In an optional embodiment, the transfer region 68 can be designed and operated as a low field mobility filter wherein the first axial force is preferably a gas flow towards the exit of the transfer region and the second force is a DC field barrier. The optional embodiment builds a tandem differential TIMS/TIMS device.

FIG. 13 shows schematically the working principle of the fourth embodiment (FIG. 12) of the trapped ion mobility separator according to the invention at different points in time during the analysis process (FIG. 13*a*, 13*b*, 13*c*, 13*d*, 13*e*). On the left side of the respective figures, schematically the location and distribution of the ions within the ion channel 66 is shown for the respective time point; on the right side (top), the generated transfer field Ez along the longitudinal z-direction of the ion channel 66 is shown for the corresponding time point; on the right side (middle), the generated reduced dispersion field Ed (first axial force) along the longitudinal z-direction of the ion channel 66 is shown for the corresponding time point; and on the right side (bottom), the generated compensation field Ec (second axial force) along the longitudinal z-direction of the ion channel 66 is shown for the corresponding time point. The dashed line shown in the figures on the right side represents the different regions in the trapped ion mobility separator 58, namely the transfer region 68 and the separation region 60.

The transfer field Ez is set up for transferring ions from the transfer region 68 into the separation region 60. Therefore, the transfer field Ez is directed along the z-direction of the trapped ion mobility separator. Additionally, a transfer field Ex is generated, not presented on the right side of the figure. The additional transfer field Ex is set up for transmitting ions, in particular eluted ions from the separation region 60, to a downstream located component/device (not shown in the figure). Therefore, the transfer field Ex is directed along the x-direction of the trapped ion mobility separator. In the embodiment example, the generated transfer field Ex is a DC field. Additionally, RF-confinement voltages are applied (y-z-direction).

Figure 13A:
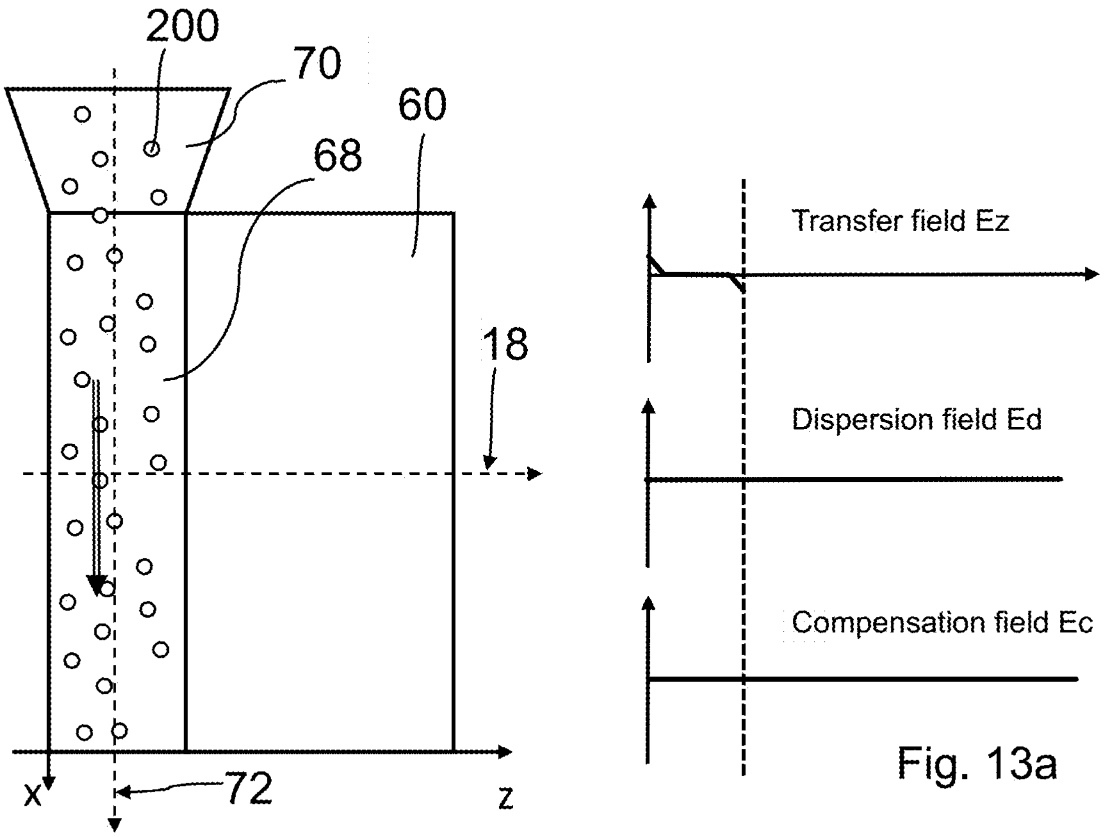
FIG. 13*a* shows schematically the working principle of the fourth embodiment of the trapped ion mobility separator according to the invention, referring to a first point in time during the analysis process.

FIG. 13*a* refers to a first selected point in time, in particular FIG. 13*a* represents a "transmission-phase". As can be seen in FIG. 13*a*, left side, ions 200 (schematically presented as circles; for a better overview, only one ion 200 is provided with a reference sign) flow into the transfer region 68 through the entrance funnel 70. The transfer field Ex is switched on for transmitting ions to a downstream located component/device (not shown in the figure). As can be seen FIG. 13*a*, right side, the transfer field Ez is switched off, as to confine the ions 200 in the transfer region 68. The dispersion field Ed and the compensation field Ec used for the separation of the ion within the separation region 60 are switched off as well, as there are no ions present in the separation region 60.

Figure 13B:
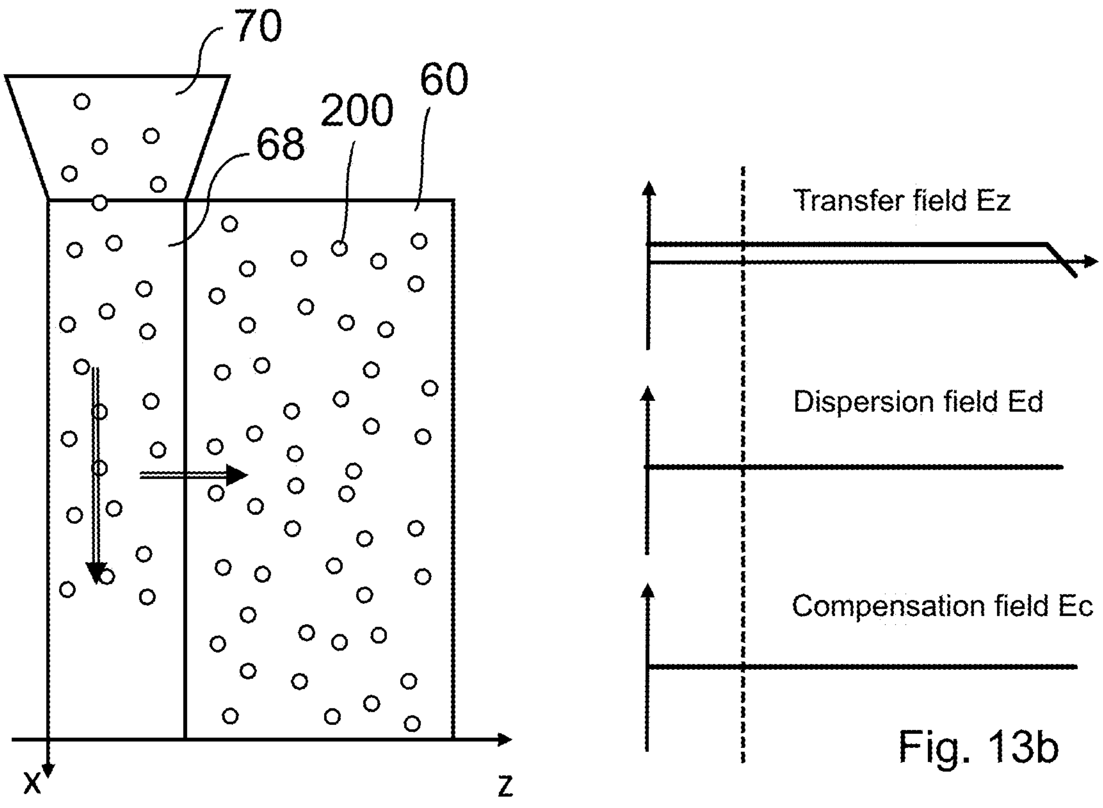
FIG. 13*b* shows schematically the working principle of the fourth embodiment of the trapped ion mobility separator according to the invention, referring to a second point in time during the analysis process.

FIG. 13*b* refers to a second selected point in time, in particular FIG. 13*b* represents a "injection-phase". As can be seen in FIG. 13*b*, left side, further ions 200 (for a better overview, only one ion 200 is provided with a reference sign) flow into the transfer region 68 through the entrance funnel 70. Simultaneously, ions 200 are transferred from the transfer region 68 into the separation region 60. As can be seen FIG. 13*b*, right side, the transfer field Ez is switched on, as to transfer the ions 200 into the separation region 60. The dispersion field Ed and the compensation field Ec used for the separation of the ion within the separation region 60 are still switched off, as the ions 200 are just entering into the separation region 60. Additionally, a DC-confinement field is generated at the exit of the separation region 60.

Figure 13C:
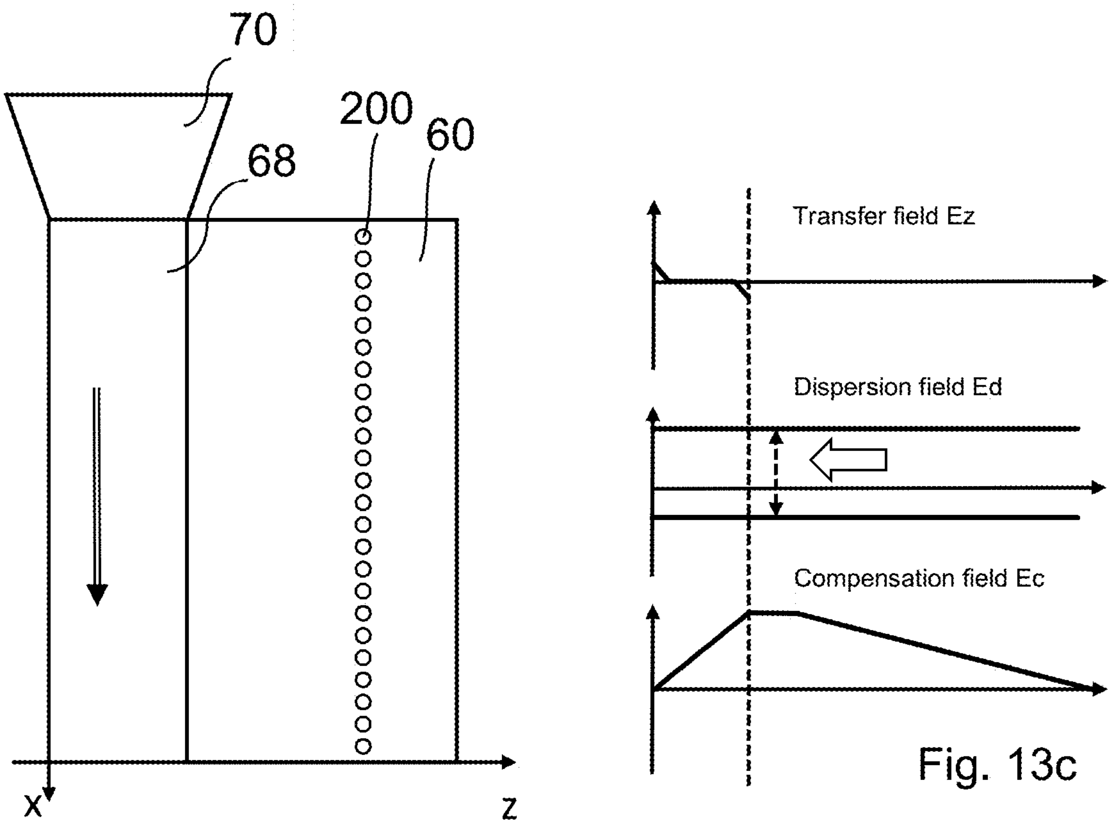
FIG. 13*c* shows schematically the working principle of the fourth embodiment of the trapped ion mobility separator according to the invention, referring to a third point in time during the analysis process.

FIG. 13*c* refers to a third selected point in time, in particular FIG. 13*c* represents a "spatial separation-phase". As can be seen in FIG. 13*c*, the inflow of ions into the transfer region 68 through the entrance funnel 70 is stopped. The ions 200 (for a better overview, only one ion 200 is provided with a reference sign) are separated and trapped in the separation region 60. The transfer field Ex is switched on for transmitting ions 200 eluted from the separation region 60 to a downstream located component/device (not shown in the figure). As can be seen FIG. 13*b*, right side, the transfer field Ez is switched off. The dispersion field is switched on, causing a differential mobility drift of the ions 200 towards the first end 62 of the separation region 60. The compensation field is switched on and at a maximum level. As described with reference to FIG. 12, in this embodiment, the compensation field (representing the counteracting second axial force) comprises a spatial gradient along the longitudinal (z) direction, which extends into a plateau where the force is spatially constant. Due to this spatial variation, there are mobility-dependent positions along the axis at which the net drift of the two opposite drifts vanishes and ions 200, which are separated according to their differential mobility are trapped along the axis.

Figure 13D:
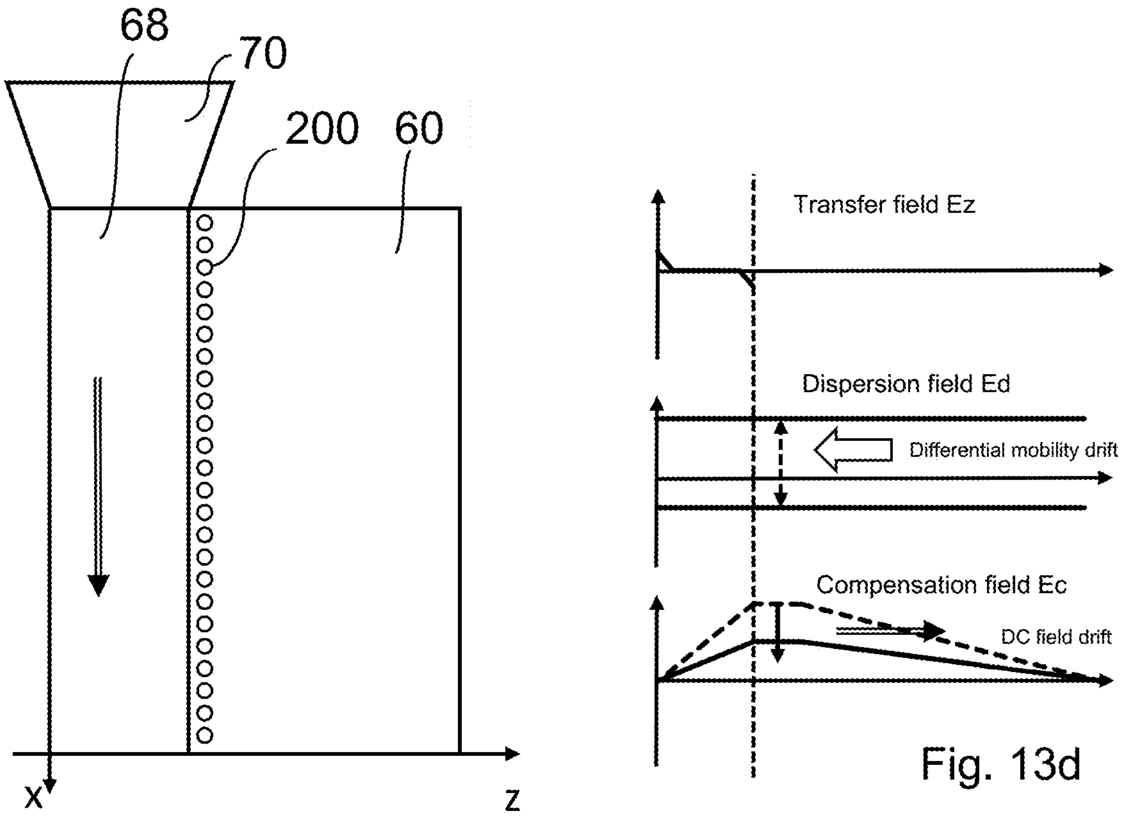
FIG. 13*d* shows schematically the working principle of the fourth embodiment of the trapped ion mobility separator according to the invention, referring to a fourth point in time during the analysis process.

FIG. 13*d* refers to a fourth selected point in time, in particular FIG. 13*d* represents an "elution-phase". As can be seen in FIG. 13*d*, the ions 200 (for a better overview, only one ion 200 is provided with a reference sign) are still separated and trapped in the separation region 60, however, they move in a controlled manner toward the first end 62 of the separation region 60. As can be seen FIG. 13*b*, right side, the transfer field Ez is still switched off. The dispersion field is switched on, still causing a differential mobility drift of the ions 200 towards the first end 62 of the separation region 60. The compensation field is switched on, but at a decreased level, to allow the separated ions 200 to move towards the first end 62 of the separation region 60.

Figure 13E:
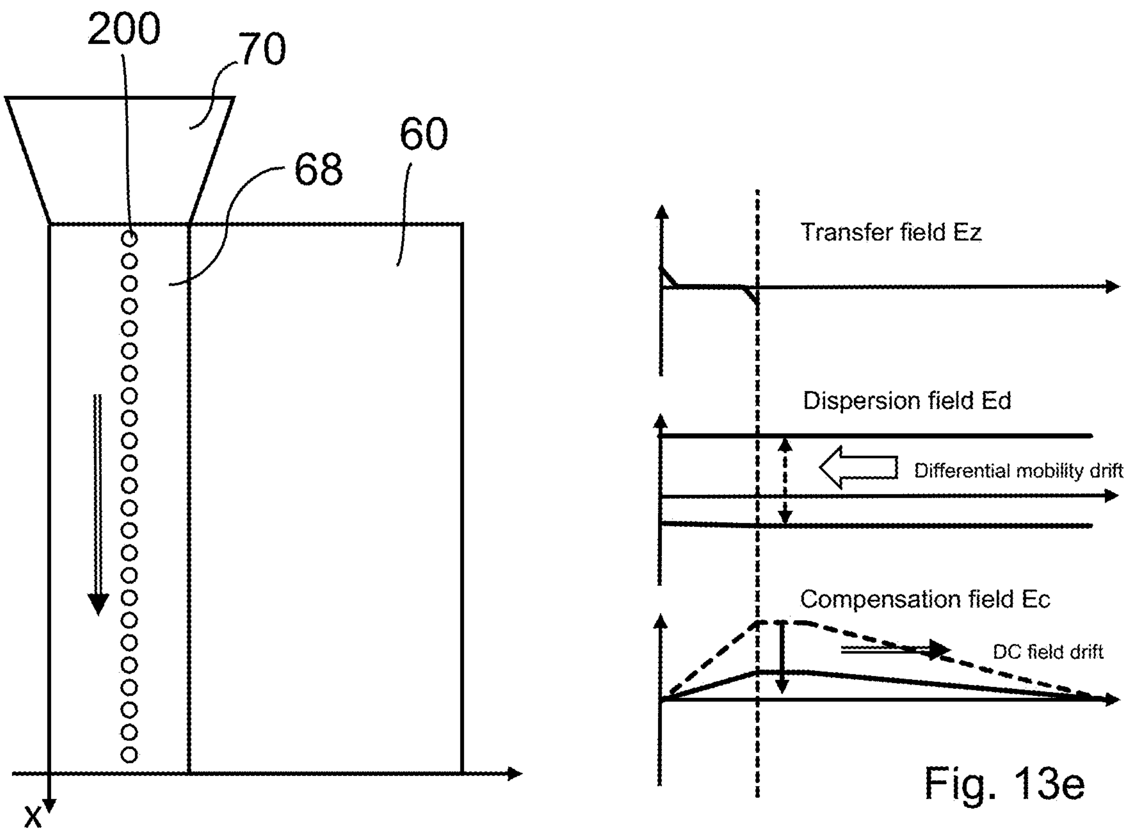
FIG. 13*e* shows schematically the working principle of the fourth embodiment of the trapped ion mobility separator according to the invention, referring to a fifth point in time during the analysis process.

FIG. 13*e* refers to a fifth selected point in time, in particular FIG. 13*e* represents a "transfer-phase". As can be seen in FIG. 13*e*, the separated ions 200 (for a better overview, only one ion 200 is provided with a reference sign) are eluted from the separation region 60 and enter into the transfer region 68. The transfer field Ex is switched on for transmitting the ions 200 eluted from the separation region 60 to a downstream located component/device (not shown in the figure). As can be seen FIG. 13*b*, right side, the transfer field Ez is still switched off. The dispersion field is switched on, still causing a differential mobility drift of the ions 200. The compensation field is switched on, but at a further decreased level, to allow the separated ions 200 to finally move back into the transfer region 68.

Figure 14:
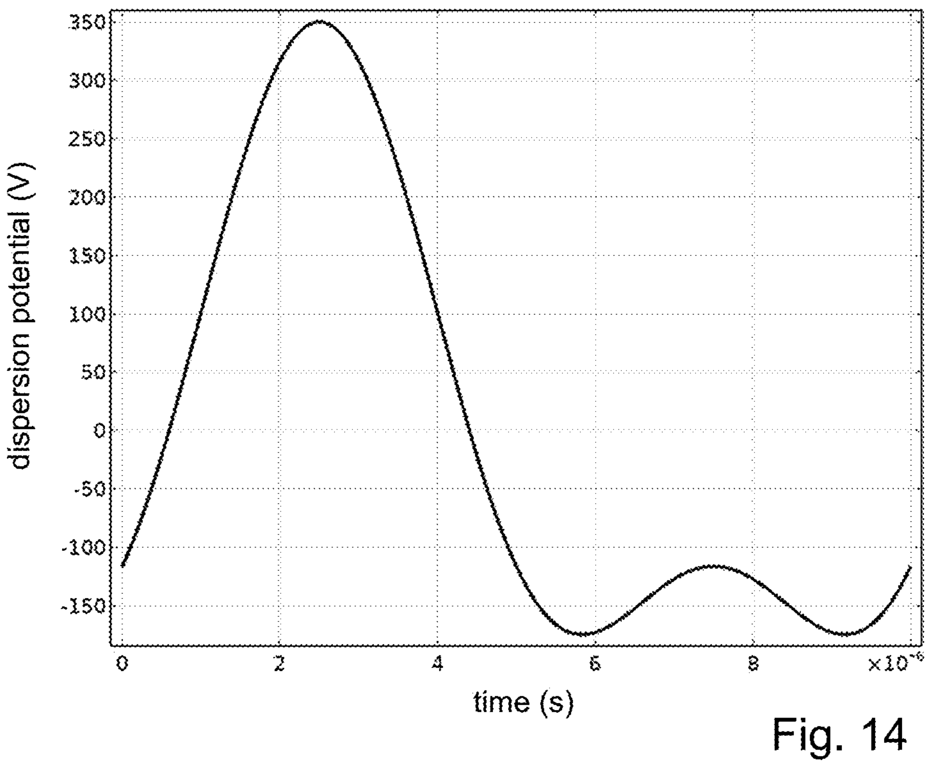
FIG. 14 presents a temporal profile of the dispersion potential applied to the first electrode.

FIG. 14 presents a temporal profile of the dispersion potential applied to the second electrode 22, with reference to the trapped ion mobility separator 58 from FIG. 12. On the ordinate, the dispersion potential (V) at the second electrode 22 is shown, and on the abscissa the time(s) is shown. The second electrode 22 is assigned to the second end 64 of the ion channel 66.

As can be seen in the figure, a bi-sinusoidal voltage is applied to the second electrode 22. The maximum potential at the second electrode 22 is about 350V. The minimum potential at the second electrode 22 is about-175 V. In the embodiment example, the applied alternating separating voltage has a frequency of 100 kHz. The first electrode 20, which is assigned to the first end 62 of the ion channel 66, has a potential of 0 V or, in other words, the first electrode 20 is maintained at ground potential.

FIG. 15 shows a schematic diagram of a mass spectrometric system 100 according to the invention. The mass spectrometric system 100 is used for analyzing ions. The mass spectrometric system 100 comprises a plurality of analysis devices, which are described in the following.

The mass spectrometric system 100 comprises a separation device (not shown in the figure) for the separation of a mixture of substances. In the embodiment example, the separation device is a liquid chromatography device. Other separation devices (not shown in the figure), such as an electrophoretic device, may be provided and can be coupled to the mass spectrometric system 100.

Further, the mass spectrometric system 100 comprises an ion generator 110. The ion generator 110 comprises an ion source 112. In the embodiment example, the ion source 112 is an electrospray ion source (ESI). The ion source 112 operates at atmospheric pressure. Other ion source types which may be used include, for example, thermal spray, desorption ionization (e.g., matrix-assisted laser/desorption ionization (MALDI) or secondary ionization), chemical ionization (CI), photoionization (PI), electron impact ionization (EI), and gas-discharge ionization. Further, the ion generator 110 comprises an ion source chamber 114. The ion source chamber 114 is held at atmospheric pressure. In particular, the ion source chamber 114 incorporates the ion source 112. The ion generator 110 is located downstream of the liquid chromatography device. Further, a transfer capillary 116 is provided. The transfer capillary 116 has a first end 118. The first end 118 of the transfer capillary 116 is connected with the ion source chamber 114. Further, the transfer capillary 116 has a second end 120. The second end 120 of the transfer capillary 116 is connected with a vacuum chamber 124 of a first trapped ion mobility separator 122. In particular, the transfer capillary 116 is set up to introduce ions generated by the (ESI) ion source 112 into the vacuum chamber 124. In the embodiment example, the transfer capillary 116 is a short wide bore capillary with an inner diameter of 1 mm or more and a length of 180 mm or less. Optionally, multiple capillaries or single/multiple orifice inlets can be used to transfer the ions from the ion source chamber 114 to the vacuum chamber 124.

Further, the mass spectrometric system 100 comprises the first trapped ion mobility separator 122. In the embodiment example, the first trapped ion mobility separator is a differential trapped ion mobility separator (dTIMS) 122 according to the invention. In particular, in the embodiment example, the first trapped ion mobility separator 122 corresponds to the trapped ion mobility separator 46 from FIG. 11*a*, having a circular cross-sectional profile along the axis 18. In this respect, reference is also made to the preceding description. The trapped ion mobility separator 122 is located downstream of the ion generator 110. The trapped ion mobility separator 122 comprises the vacuum chamber 124. In the embodiment example, the vacuum chamber 124 is held at an elevated pressure between 300 Pa and 3000 Pa. It is conceivable, that, in another preferred embodiment, the vacuum chamber comprises an additional sub-ambient ESI ion source. Further, the trapped ion mobility separator 122 comprises a deflector electrode 126. It is conceivable, that, in another preferred embodiment, an additional MALDI source (not shown in the figure) can be located at the position of the deflector electrode. Further, the trapped ion mobility separator 122 comprises an entrance funnel 128. In particular, the entrance funnel 128 is a RF-entrance funnel. Further, the trapped ion mobility separator 122 comprises an ion trap 130. The ion trap 130 is set up for trapping ions while a downstream located separation region 134 is operated to generate multiple fractions of ions (for example 2 to 10 fractions) each comprising a range of differential mobilities. Further, the trapped ion mobility separator 122 comprises a transfer region 132. The transfer region 132 is set up for transferring ions from the ion trap 130 to the separation region 134. Further, the trapped ion mobility separator 122 comprises the separation region 134. The separation region 134 is set up for separating ions. Further, the trapped ion mobility separator 122 comprises an exit funnel 136. In the embodiment example, the trapped ion mobility separator 122 operates at a pressure of 5 mbar. Further, an inter-chamber aperture 138 is provided. Through the inter-chamber aperture 138 ions can be transmitted from the vacuum chamber 124 to a vacuum chamber 142 of a second trapped ion mobility separator 140.

Further, the mass spectrometric system 100 comprises the second trapped ion mobility separator 140. In the embodiment example, the second trapped ion mobility separator is a TIMS 140 constructed and operated in a manner to disperse ions according to ion mobility, preferably in the low field limit (hereinafter referred to as classical TIMS 140). Alternatively, a dTIMS could be provided as second trapped ion mobility separator. The classical TIMS 140 is constructed and operated for separating ions according to their mobility. The classical TIMS 140 is located downstream of the differential trapped ion mobility separator 122. The classical TIMS 140 comprises a vacuum chamber 142. In the embodiment example, the vacuum chamber 142 is held at a lower pressure than the pressure of the upstream vacuum chamber 124, e.g., at a pressure between 100 Pa and 300 Pa. Further, the classical TIMS 140 comprises a deflector electrode 144. Further, the classical TIMS 140 comprises an entrance funnel 146. In particular, the entrance funnel 146 is an RF-entrance funnel. Further, the classical TIMS 140 comprises a separation region 148. The separation region 148 is set up for separating ions.

Further, in the embodiment example, an additional ion trap (not shown in the figure) is located between the dTIMS 122 and the classical TIMS 140. The additional ion trap may have a same storage capacity as the classical TIMS 140.

Further, the mass spectrometric system 100 comprises an ion guide apparatus 150. The ion guide apparatus 150 is set up for guiding ions. The ion guide apparatus 150 is located downstream of the classical TIMS 140. The ion guide apparatus 150 comprises an RF-ion guide 152. Further, the ion guide apparatus 150 comprises an ion guide chamber 154. The ion guide chamber 154 incorporates the RF-ion guide 152. The ion guide chamber 154 serves as a pressure stage between the medium vacuum of the classical TIMS 140 and the high vacuum under which a downstream located mass filter apparatus 156 is operated.

Further, the mass spectrometric system 100 comprises the mass filter apparatus 156. The mass filter apparatus 156 is set up to guide or select ions according to mass. The mass filter apparatus 156 is located downstream of the ion guide apparatus 150. The mass filter apparatus 156 comprises a mass filter 158. In the embodiment example, the mass filter 158 is a quadrupole mass filter. Further, the mass filter apparatus 156 comprises a mass filter chamber 160. The mass filter chamber 160 contains the quadrupole mass filter 158.

Further, the mass spectrometric system 100 comprises a fragmentation cell 162. The fragmentation cell 162 is set up to fragment larger ions to allow mass spectrometric measurement of the ion fragments. The fragmentation cell 162 is located downstream of the mass filter apparatus 156. In the embodiment example, fragmentation is done using collision induced dissociation (CID). However, any other known type of fragmentation may also be used including, but not limited to, infrared multiple photon-dissociation (IRMPD) or ultraviolet photo-dissociation (UVPD), surface induced dissociation (SID), photo-dissociation (PD), electron capture dissociation (ECD), electron transfer dissociation (ETD), collisional activation after electron transfer dissociation (ETcD), activation concurrent with electron transfer dissociation (AI-ETD) and fragmentation by reactions with highly excited or radical neutral particles. The fragmentation cell 162 comprises electrodes 164. Further, the fragmentation cell 162 comprises a fragmentation cell chamber 166. The fragmentation cell chamber 166 contains the electrodes 164. The fragmentation by CID can be switched on and off, controlled by instrumental parameters, e.g., an axial acceleration voltage. Precursor ions can be trapped in the fragmentation cell 162 without being fragmented, as well as fragment ions when fragmentation is enabled.

Further, the mass spectrometric system 100 comprises a mass analyzer 168. In the embodiment example, the mass analyzer 168 is a time-of-flight analyzer with orthogonal ion injection (OTOF-MS). Other possible mass analyzers include an electrostatic ion trap, an RF ion trap, an ion cyclotron frequency ion trap and a quadrupole mass filter. The mass analyzer 168 is set up to analyze ions according to mass. The mass analyzer 168 is located downstream of the fragmentation cell 162. The mass analyzer 168 comprises an accelerator 170 (or pulser). Further, the mass analyzer 168 comprises a flight tube 172. In the embodiment example, the flight tube 172 is field free. Further, the mass analyzer 168 comprises a reflector 174. Further, the mass analyzer 168 comprises an ion detector 176. An additional reflector can be located between the accelerator 170 and the ion detector 176 such that the ions are reflected twice in the reflector 174 and move on w-shaped trajectories instead of V-shaped trajectories.

In the following, the basic mode of operation of the mass spectrometric system 100 according to the invention is described:

Sample material is eluted from the liquid chromatography device (not shown in the figure). Ions are generated by the (ESI) ion source 112 using the sample material eluted from the liquid chromatography device. Via the transfer capillary 116, the generated ions are introduced into the first vacuum chamber 124 of the first trapped ion mobility separator, the dTIMS 122. Subsequently, the ions are deflected into the RF-entrance funnel 128 of the dTIMS 122 by a repelling electric DC-potential applied to the deflector electrode 126 of the dTIMS 122. The RF-entrance funnel 128 collects the ions and guides them to the ion trap 130 of the dTIMS 122. In the embodiment example, the dTIMS 122 operates in a parallel collection mode. That means, ions are accumulated in the ion trap 130, before being transferred to the separation region 134, while simultaneously other ions are separated downstream in the separation region 134. In the separation region 134 of the dTIMS 122 the ions are separated and trapped by a force equilibrium of the first axial force and the second axial force, during an accumulation phase. During a subsequent elution phase, by step wisely varying at least one of the first axial force and the second axial force over time, fractions of trapped ions are driven progressively to the exit funnel 136 as a function of their differential mobility.

Subsequently, the ions of the fractions are transmitted from the vacuum chamber 124 of the dTIMS 122 through the inter-chamber aperture 138 into the vacuum chamber 142 of the classical TIMS 140. In the classical TIMS 140 the transmitted ions are then deflected by the deflector electrode 144 into the RF-entrance funnel 146. The RF-entrance funnel 146 collects the ions and guides them to the separation region 148 of the classical TIMS 140. In the separation region 148 of the classical TIMS 140 the ions are separated according to their mobility. In the embodiment example, the classical TIMS 140 uses a gas flow and a DC field barrier as the two counteracting forces. The gas flow in the classical TIMS 140 is generated by pumping away gas from the exit of the classical TIMS 140 through a pumping port (not shown in the figure) and through an aperture (not shown in the figure) between the vacuum chamber 124 and the vacuum chamber 142. During an accumulation phase, the two counteracting forces are balanced such that, for each ion species of interest, an equilibrium point of zero velocity exists within the classical TIMS 140. During a subsequent elution phase, the trapped ion species are eventually released from the classical TIMS 140 by continuously changing the DC-field gradient such that the ion species in the classical TIMS 140 are sequentially eluted according to their mobility K. This relative change in the opposing axial forces may be progressive, such that ion species of increasing mobility K successively exit the classical TIMS 140. In the embodiment example, the dTIMS 122 and the classical TIMS 140 are operated in parallel. That means, the dTIMS 122 generates fractions each of which is individually separated in the downstream located classical TIMS 140 before the next fraction is transferred to the classical TIMS 140.

Subsequently, the ions released from the classical TIMS 140 enter the downstream located ion guide chamber 154 of the ion guide apparatus 150. The RF-ion guide 152 guides the ions into the further downstream located mass filter chamber 160 of the mass filter apparatus 156, in which the mass filter 158 is located. In the mass filter 158, ions are guided or selected according to mass. Subsequently, the ions that pass through the mass filter 158 are directed to the fragmentation cell 162, located downstream of the mass filter apparatus 156 in the fragmentation cell chamber 166. In the fragmentation cell 162, larger ions are dissociated into fragment ions to allow mass spectrometric measurement of the ion fragments. DC-voltages are applied to the electrodes 164 of the fragmentation cell 162 to generate an axial DC-field for ejecting the ion fragments into the downstream located mass analyzer 168, where they are analyzed according to their mass.

While the ion species of one fraction are analyzed in the other components of the mass spectrometric system 100, the remaining ions can be trapped in the dTIMS 122. As, in the embodiment example, the dTIMS 122 comprises an upstream ion trap 130, ions generated by the ion source 112 can be trapped until all fractions are transferred to the classical TIMS 140. In the embodiment example, the dTIMS 122 is operated to transfer N fractions to the classical TIMS 140, therefore the storage capacity of the dTIMS 122 and its ion trap 130 located upstream of the separation region 134, which is used for parallel accumulation, is N times higher than the storage capacity of the downstream located classical TIMS 140. In the embodiment example, one scan of the classical TIMS 140 lasts a time span of 50 ms, accordingly, the dTIMS 122 and its upstream ion trap 130 have a storage capacity to trap the ions generated by the ion source 112 for N times 50 ms. Typically, N equals five.

In the above-described embodiment of the mass spectrometric system 100, the components are nested coupled. In particular, the sequentially arranged dTIMS and classical TIMS are nested coupled, thus representing a tandem dTIMS/TIMS device. Accordingly, multiple fractions, which are produced by the dTIMS 122 are subsequently separately analyzed by the classical TIMS 140. Additionally, in the embodiment example, the liquid chromatography device and the time-of-flight mass analyzer 168 are nested coupled with the tandem dTIMS/TIMS device. This nested coupling allows to perform parallel accumulation serial fragmentation (PASEF), which, in the context of the disclosure may be termed as differential parallel accumulation serial fragmentation (dPASEF), as a dTIMS is included. In such nested coupled systems, the different separation devices operate on different time frames, what offers the advantage that the individual separation techniques do not have to wait for each other. However, subsequent analyses should be fast enough to reproduce the peak determined with the preceding method. Typically, a liquid chromatography device can operate on a 30 minute separation time; a dTIMS coupled to the liquid chromatography device typically operates on a 1 second separation time; a TIMS coupled to the dTIMS typically operates on a 100 millisecond separation time; and finally, a time-of-flight mass analyzer coupled to the TIMS typically operates on a 200 microsecond separation time. That means, the dTIMS can fractionate the components eluted from the liquid chromatography device within 1 second and 10 fractions of the dTIMS can be analyzed by the TIMS within 1 second. Thus, due to the addition of the additional separation dimension provided by the dTIMS to a mass spectrometric system, the peak capacity can be increased by factor 10, thus, representing a significant advantage.

A preferred application of a tandem dTIMS/TIMS or variations thereof, such as a tandem dTIMS/dTIMS, being part of a mass spectrometric system can be, for example, bottom-up proteomics. Here it can be used in an advantageous way, that the knowledge about the differential mobility obtained from dTIMS is added as an orthogonal information to the classical mobility measurement done by the classical TIMS. This can be used to further distinguish peptide ions.

Typically, in bottom-up proteomics, digest peptides are separated in a liquid chromatography device and then ionized in an electrospray ion source. Often, the separated peptide ions are additionally separated in the gas phase using a classical ion mobility separator constructed and operated to disperse ions according to ion mobility. The separated peptide ions are further isolated according to mass-to-charge ratio in a mass filter, and then fragmented in a fragmentation cell. Mass spectra of the fragment ions, and, as the case may be, the precursor ions, are acquired and used to identify the peptide ions and the associated proteins. However, the information content of fragment mass spectra of singly charged peptide ions is commonly limited. Furthermore, other singly charged background ion species together with the singly charged peptide ions may compromise the performance of the mass spectrometric system, for example the classical ion mobility separator, the fragmentation cell, or the mass analyzer. Therefore, it is of great interest to eliminate singly charged background ions and singly charged peptide ions from the analysis, especially because these singly charged ion species often account for a significant number of all ion species.

The aforementioned tandem dTIMS/TIMS can be used here in an advantageous manner, as a dTIMS can substantially separate ion species according to their charge state. In a preferred embodiment, the dTIMS can be operated such that multiple fractions predominately comprising ion species with charge state $Z>1$ are transferred to the downstream classical TIMS while the fraction predominately comprising ion species with charge state $Z=1$ is not transferred but discarded. Alternatively, it is conceivable, the fraction predominately comprising ion species with charge state $Z=1$ can separately be transferred to the downstream classical TIMS for analysis. Subsequently, the ion species of each fraction can be separated in individual scans of the classical TIMS and further processed in downstream components of a mass spectrometric system. Thus, an advantage of this tandem dTIMS/TIMS device is that the classical TIMS is not overloaded with singly charged ion species whose fragment spectra have no or little information but consume a considerable amount of the storage capacity of the classical TIMS. In this way, the performance of the classical TIMS is kept high by reducing the useless singly charged ion species.

The invention has been shown and described above with reference to a number of different embodiments thereof. It will be understood, however, by a person skilled in the art that various aspects or details of the invention may be changed, or various aspects or details of different embodiments may be arbitrarily combined, if practicable, without departing from the scope of the invention. Generally, the foregoing description is for the purpose of illustration only, and not for the purpose of limiting the invention, which is defined solely by the appended claims, including any equivalent implementations, as the case may be.

REFERENCE SIGNS

10 trapped ion mobility separator
12 ion channel
14 first end of the ion channel
15 entrance region
16 second end of the ion channel
17 exit region
18 axis (of the ion channel)
20 first electrode
22 second electrode
24 separation region
26 additional electrodes
30 first generator
32 second generator
34 electrical controller
36 trapped ion mobility separator
38 ion trap
40 first end of the ion trap
42 second end of the ion trap
44 transfer region
46 trapped ion mobility separator
48 ion channel
50 exterior wall
52 interior wall
54 interior
56 funnel
58 trapped ion mobility separator
60 separation region

62 first end of the separation region
64 second end of the separation region
66 ion channel
68 transfer region
70 funnel
72 axis (funnel)
100 mass spectroscopic system
110 ion generator
112 ion source
114 ion source chamber
116 transfer capillary
118 first end of the transfer capillary
120 second end of the transfer capillary
122 trapped ion mobility separator
124 vacuum chamber
126 deflector electrode
128 entrance funnel
130 ion trap
132 transfer region
134 separation region
136 exit funnel
138 inter-chamber aperture
140 trapped ion mobility separator
142 vacuum chamber
144 deflector electrode
146 entrance funnel
148 separation region
150 ion guide apparatus
152 RF-ion guide
154 ion guide chamber
156 mass filter apparatus
158 mass filter
160 mass filter chamber
162 fragmentation cell
164 electrodes
166 fragmentation cell chamber
168 mass analyzer
170 accelerator
172 flight tube
174 reflector
176 ion detector
200 ions
x first lateral extension direction of the ion channel
Y second lateral extension direction of the ion channel
Z longitudinal extension direction of the ion channel

The invention claimed is:

1. A trapped ion mobility separator comprising:

an ion channel in which ions move along an axis between a first end of said ion channel, at which ions are introduced into said ion channel, and a second end of said ion channel, said ion channel containing a gas through which the ions pass, wherein the ion channel is supplied with radially confining voltages for preventing the ions from escaping the ion channel laterally, at least a first electrode and a second electrode arranged spaced apart from each other along said axis of said ion channel for defining an ion separation region therebetween, a first generator that causes a first axial force to be exerted on the ions along said axis by applying a separating voltage to said first electrode and said second electrode to generate an alternating axial electric field, the first axial force having an effect on the movement of the ions that is dependent on differential mobility by virtue of its interplay with said gas, wherein said separating voltage is an alternating voltage and is applied so that for a first time interval an electric field with a first field strength is generated, and for a second time interval, following said first time interval, an opposing electric field with a second field strength is generated, which is lower in magnitude than the first field strength, said first time interval lasting a shorter time span than said second time interval, a second generator that causes a second axial force to be exerted on the ions along said axis, which is counteracting said first axial force at least temporarily, wherein said first generator and said second generator are configured such that at least one of the axial forces is changing in strength along the axis for trapping ions along said axis at mobility dependent positions where a force equilibrium of said first axial force and said second axial force exists for the ions, and an electrical controller which communicates with said first generator and said second generator to vary at least one of said first axial force and said second axial force over time, such that the trapped ions are driven progressively to one of said first end and said second end of said ion channel as a function of their differential mobility.

2. The trapped ion mobility separator according to claim 1, wherein said separating voltage is a substantially rectangular voltage or a bi-sinusoidal voltage.

3. The trapped ion mobility separator according to claim 1, wherein said separating voltage has a frequency of 50 kHz to 2 MHz.

4. The trapped ion mobility separator according to claim 1, wherein the alternating axial electric field generated by said first generator has a maximum strength of 20 Td to 500 Td.

5. The trapped ion mobility separator according to claim 1, wherein said second axial force is caused by said second generator applying compensation voltages to said first electrode and said second electrode to generate an electrical compensation field, or by said second generator generating an axial gas flow.

6. The trapped ion mobility separator according to claim 1, wherein said first electrode and said second electrode are shaped and aligned so that said first electrode and said second electrode are enclosing said separation region within said ion channel perpendicular to said axis.

7. The trapped ion mobility separator according to claim 6, wherein said ion channel comprises a plurality of additional electrodes of the same shape and alignment as said first electrode and said second electrode, wherein said additional electrodes are located along said axis within said ion channel between said first electrode and said second electrode, and/or whereby said additional electrodes are connected by means of a resistor chain or are supplied with voltages using separate voltage generators.

8. The trapped ion ion mobility separator according to claim 1, wherein said ion channel has an elongate cross-sectional profile perpendicular to the axis with a first direction of extension and a second direction of extension, the first direction of extension being longer than the second direction of extension, or a circular cross-sectional profile perpendicular to the axis.

9. The trapped ion mobility separator according to claim 1, further comprising a vacuum system configured to operate the trapped ion mobility separator at a gas pressure in a range of 0.5 mbar to 20 mbar.

10. The trapped ion mobility separator according to claim 1, further comprising an ion trap for storing ions, located upstream of said separation region within said ion channel.

11. The trapped ion mobility separator according to claim 1, wherein said first generator and said second generator are configured such that the effective axial force resulting from the first axial force and second axial force is forming a barrier with a substantially constant plateau where the trapped ions leave said separation region and/or said ion channel.

12. The trapped ion mobility separator according to claim 1, wherein said separating voltage applied by said first generator is applied so that the potential applied to said first electrode has an opposite polarity to the potential applied to said second electrode.

13. The trapped ion mobility separator according to claim 1, wherein said first generator and said second generator are configured such that the variation of the at least one of said first axial force and said second axial force over time is stepwise resulting in release of multiple fractions, each fraction comprising multiple ion species, or substantially continuous.

14. A mass spectrometric system comprising an ion source, a mass analyzer with an ion detector, and at least a first trapped ion mobility separator located downstream of said ion source and/or upstream of said mass analyzer, wherein said first trapped ion mobility separator comprises:

an ion channel in which ions move along an axis between a first end of said ion channel, at which ions are introduced into said ion channel, and a second end of said ion channel, said ion channel containing a gas through which the ions pass, wherein the ion channel is supplied with radially confining voltages for preventing the ions from escaping the ion channel laterally, at least a first electrode and a second electrode arranged spaced apart from each other along said axis of said ion channel for defining an ion separation region therebetween, a first generator that causes a first axial force to be exerted on the ions along said axis by applying a separating voltage to said first electrode and said second electrode to generate an alternating axial electric field, the first axial force having an effect on the movement of the ions that is dependent on differential mobility by virtue of its interplay with said gas, wherein said separating voltage is an alternating voltage and is applied so that for a first time interval an electric field with a first field strength is generated, and for a second time interval, following said first time interval, an opposing electric field with a second field strength is generated, which is lower in magnitude than the first field strength, said first time interval lasting a shorter time span than said second time interval, a second generator that causes a second axial force to be exerted on the ions along said axis, which is counteracting said first axial force at least temporarily, wherein said first generator and said second generator are configured such that at least one of the axial forces is changing in strength along the axis for trapping ions along said axis at mobility dependent positions where a force equilibrium of said first axial force and said second axial force exists for the ions, and an electrical controller which communicates with said first generator and said second generator and varies at least one of said first axial force and said second axial force over time, such that the trapped ions are driven progressively to one of said first end and said second end of said ion channel as a function of their differential mobility.

15. The mass spectrometric system according to claim 14, further comprising a fragmentation cell, located between said first trapped ion mobility separator and said mass analyzer.

16. The mass spectrometric system according to claim 15, further comprising a mass filter, located between said first trapped ion mobility separator and said fragmentation cell.

17. The mass spectrometric system according to claim 14, further comprising a second ion mobility separator, which is located downstream of said first trapped ion mobility separator.

18. The mass spectrometric system according to claim 17, further comprising a first housing assigned to the first trapped ion mobility separator and a second housing assigned to the second ion mobility separator, the first housing and the second housing each containing a gas, whereas the gas contained in the first housing differs from the gas contained in the second housing.

19. The mass spectrometric system according to claim 17, further comprising an ion selector for selecting ions, the ion selector being located between said first trapped ion mobility separator and said second ion mobility separator.

20. The mass spectrometric system according to claim 17, further comprising a first ion trap for storing ions, the first ion trap being located upstream of said first trapped ion mobility separator and/or a second ion trap for storing ions, the second ion trap being located between said first trapped ion mobility separator and said second ion mobility separator.

21. A method for analyzing ions using a first trapped ion mobility separator, comprising the steps of:

providing an ion channel in which ions move along an axis between a first end of said ion channel, at which ions are introduced into said ion channel, and a second end of said ion channel, said ion channel containing a gas through which the ions pass, wherein the ion channel is supplied with radially confining voltages for preventing the ions from escaping the ion channel laterally, providing at least a first electrode and a second electrode arranged spaced apart from each other along said axis of said ion channel for defining an ion separation region therebetween, generating a first axial force that is imparted to the ions along said axis by applying an alternating separating voltage to said first electrode and said second electrode to generate an alternating axial electric field, the first axial force having an effect on the movement of the ions that is dependent on differential mobility by virtue of its interplay with said gas, applying said alternating separating voltage so that for a first time interval an electric field with a first field strength is generated, and for a second time interval, following said first time interval, an opposing electric field with a second field strength is generated, which is lower in magnitude than the first field strength, said first time interval lasting a shorter time span than said second time interval, generating a second axial force that is imparted to the ions along said axis and that counteracts said first axial force at least temporarily, changing at least one of the axial forces in strength along the axis for trapping ions along said axis at mobility dependent positions where a force equilibrium of said first axial force and said second axial force exists for the ions, and varying at least one of said first axial force and said second axial force over time, such that the trapped ions are driven progressively to one of said first end and said second end of said ion channel as a function of their differential mobility.

22. The method for analyzing ions according to claim 21, further comprising generating the alternating axial electric field with a maximum strength of 20 Td to 500 Td.

23. The method for analyzing ions according to claim 21, further comprising analyzing separated ions as a function of mobility in a second ion mobility separator located downstream of said first trapped ion mobility separator.

24. The method for analyzing ions according to claim 23, further comprising analyzing separated ions as a function of mass in a mass analyzer located downstream of said second ion mobility separator constructed and operated to disperse ions according to ion mobility.

25. The method for analyzing ions according to claim 21, further comprising dissociating separated ions into fragment ions and analyzing said fragment ions in a mass analyzer located downstream of said first trapped ion mobility separator and/or a second ion mobility separator, constructed and operated to disperse ions according to ion mobility and being located downstream of said first trapped ion mobility separator.

26. The method for analyzing ions according to claim 25, wherein the separated ions are selected and/or filtered according to mass and/or according to their charge state prior to fragmentation.

27. The method for analyzing ions according to claim 21, further comprising accumulating ions from an ion source in an ion trap located upstream of said first trapped ion mobility separator while ions are analyzed in said first trapped ion mobility separator.

28. The method for analyzing ions according to claim 27, further comprising step-wisely varying at least one of said first axial force and said second axial force over time, such that the trapped ions are driven in multiple separated ion fractions to one of said first end and said second end of said ion channel as a function of their differential mobility.

29. The method for analyzing ions according to claim 28, further comprising analyzing said separated ion fractions as a function of mobility in a second ion mobility separator located downstream of said first trapped ion mobility separator.

30. The method for analyzing ions according to claim 29, further comprising deselecting ion fractions which substantially comprise singly charged ion species.

* * * * *